United States Patent
Guan et al.

(10) Patent No.: US 11,374,687 B2
(45) Date of Patent: Jun. 28, 2022

(54) DATA SENDING METHOD, DATA RECEIVING METHOD, AND RELATED DEVICE

(71) Applicant: HUAWEI TECHNOLOGIES CO., LTD., Guangdong (CN)

(72) Inventors: Peng Guan, Chengdu (CN); Bo Fan, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 185 days.

(21) Appl. No.: 16/598,912

(22) Filed: Oct. 10, 2019

(65) Prior Publication Data
US 2020/0044776 A1 Feb. 6, 2020

Related U.S. Application Data

(63) Continuation of application No. PCT/CN2018/080503, filed on Mar. 26, 2018.

(30) Foreign Application Priority Data

Apr. 12, 2017 (CN) .......................... 201710237464.8

(51) Int. Cl.
*H04L 1/00* (2006.01)
*H04W 72/04* (2009.01)
(Continued)

(52) U.S. Cl.
CPC .......... *H04L 1/0069* (2013.01); *H04L 1/0061* (2013.01); *H04L 27/265* (2013.01);
(Continued)

(58) Field of Classification Search
CPC ... H04L 1/0069; H04L 1/0061; H04L 27/265; H04L 5/0055; H04L 1/1896;
(Continued)

(56) References Cited

U.S. PATENT DOCUMENTS

2007/0189248 A1* 8/2007 Chang ................... H04L 1/0067
370/338
2014/0233482 A1* 8/2014 Kimura ................. H04L 1/1819
370/329
(Continued)

FOREIGN PATENT DOCUMENTS

| CN | 105979597 A | 9/2016 |
|----|----|----|
| CN | 106413105 A | 2/2017 |

(Continued)

OTHER PUBLICATIONS

Samsung,"Summary of e-mail discussions on multiplexing eMBB and URLLC in DL",TSG-RAN WG1 NR Ad-hoc Meeting,R1-1700972,Spokane, USA, Jan. 16-20, 2017, total 23 pages.
(Continued)

*Primary Examiner* — Hoang-Chuong Q Vu
(74) *Attorney, Agent, or Firm* — Womble Bond Dickinson (US) LLP

(57) ABSTRACT

This application discloses a data sending method, a data receiving method, and an apparatus. The data sending method includes: if first type data is punctured, preserving, by a network device, a punctured first data subset in the first type data and puncture location information of the first data subset in the first type data, and retransmitting the first data subset within a second scheduling period to a user equipment. In this way, the network device does not need to wait for feedback from the user equipment before the network device can perform a retransmission operation, so that latency of retransmission is reduced. In addition, the network device only needs to retransmit the punctured first data subset within the second scheduling period but does not need to retransmit the entire first type data, so that an amount of data to be retransmitted is reduced and fewer transmission resources are consumed.

20 Claims, 11 Drawing Sheets

S301: Within a first scheduling period, if first type data is punctured by second type data, preserve a first data subset, preempted by the second type data, in the first type data and puncture location information of the first data subset in the first type data S302: Transmit the first data subset, the puncture location information, and puncture indication information within a second scheduling period

(51) Int. Cl.
*H04W 80/02* (2009.01)
*H04L 27/26* (2006.01)

(52) U.S. Cl.
CPC ..... *H04W 72/042* (2013.01); *H04W 72/0466* (2013.01); *H04W 80/02* (2013.01)

(58) Field of Classification Search
CPC .. H04L 1/1812; H04L 1/1867; H04W 72/042; H04W 72/0466; H04W 80/02; H04W 72/04; H04W 72/10; H04W 72/12; H04W 72/0493; H04W 72/1242; H04W 72/1257; H04W 72/1289
See application file for complete search history.

(56) References Cited

U.S. PATENT DOCUMENTS

| | | | |
|---|---|---|---|
| 2016/0270045 A1 | 9/2016 | Mukkavilli et al. | |
| 2017/0310431 A1* | 10/2017 | Iyer | H04L 1/1819 |
| 2018/0234993 A1* | 8/2018 | Hosseini | H04L 5/0064 |
| 2018/0278368 A1* | 9/2018 | Kim | H04L 1/1854 |
| 2018/0375616 A1* | 12/2018 | Beale | H04L 1/08 |
| 2019/0098608 A1* | 3/2019 | Yi | H04L 27/26 |
| 2019/0165882 A1* | 5/2019 | You | H04L 1/1819 |
| 2019/0165906 A1* | 5/2019 | Bala | H04L 5/0091 |
| 2019/0199477 A1* | 6/2019 | Park | H04L 1/0026 |
| 2019/0319750 A1* | 10/2019 | Khosravirad | H04L 1/0061 |
| 2019/0320450 A1 | 10/2019 | Li et al. | |
| 2019/0349126 A1* | 11/2019 | Andgart | H04L 1/0013 |
| 2019/0363833 A1* | 11/2019 | Wang | H04L 1/189 |
| 2019/0379487 A1* | 12/2019 | Hwang | H04L 1/0068 |
| 2019/0379491 A1* | 12/2019 | Kilinc | H04L 1/1896 |
| 2020/0008216 A1* | 1/2020 | Iyer | H04W 72/04 |
| 2020/0015119 A1* | 1/2020 | Takeda | H04W 28/06 |
| 2020/0052812 A1* | 2/2020 | Kittichokechai | H04L 1/1819 |
| 2020/0099474 A1* | 3/2020 | Wikstrom | H04L 1/0075 |
| 2020/0213984 A1* | 7/2020 | Hwang | H04W 72/0446 |

FOREIGN PATENT DOCUMENTS

| | | |
|---|---|---|
| CN | 107295682 A | 10/2017 |
| WO | 2017056003 A2 | 4/2017 |

OTHER PUBLICATIONS

Ericsson,"eMBB/URLLC Multiplexing Solutions for Downlink",3GPP TSG-RAN WG1 Meeting #88-bis,R1-1706055, Spokane, US, Apr. 3-7, 2017, total 3 pages.
Ericsson: "eMBB/URLLC Multiplexing Solutions for Downlink",3GPP Draft; R1-1706055,Apr. 2, 2017,total 3 pages.
Nokia et al: "Punctured Scheduling for Low Latency Transmissions", 3GPP Draft; R1-1609747,Oct. 9, 2016,total 5 pages.
Spreadtrum Communications: "On DL eMBB and URLLC multiplexing transmissions",3GPP Draft; R1-1705158,Apr. 2, 2017,total 7 pages.
Ericsson: "Performance Evaluation of DL eMBB/URLLC Multiplexing",3GPP Draft; R1-1706054,Apr. 2, 2017,total 5 pages.
3GPP TS 36.211 V12.4.0 (Dec. 2014), 3rd Generation Partnership Project; Technical Specification Group Radio Access Network; Evolved Universal Terrestrial Radio Access (E-UTRA); Physical channels and modulation(Release 12), 124 pages.
3GPP TS 36.212 V13.0.0 (Dec. 2015), 3rd Generation Partnership Project; Technical Specification Group Radio Access Network; Evolved Universal Terrestrial Radio Access (E-UTRA); Multiplexing and channel coding(Release 13), 121 pages.
3GPP TS 36.213 V13.0.0 (Dec. 2015), 3rd Generation Partnership Project; Technical Specification Group Radio Access Network; Evolved Universal Terrestrial Radio Access (E-UTRA); Physical layer procedures(Release 13), 326 pages.
Qualcomm Incorporated, Outer erasure code use cases and evaluation assumptions. 3GPP TSG-RAN WG1 #85 May 23-27, 2016, Nanjing, China, R1-164703, 6 pages.

\* cited by examiner

Time-frequency resource occupied by a control channel

Time-frequency resource occupied by eMBB data

Slot n

▨ Time-frequency resource occupied by a control channel

▩ Time-frequency resource occupied by eMBB data

▦ Time-frequency resource preempted by URLLC data

Base station

User equipment

DATA SENDING METHOD, DATA RECEIVING METHOD, AND RELATED DEVICE

CROSS-REFERENCE TO RELATED APPLICATIONS

This application is a continuation of International Application No. PCT/CN2018/080503, filed on Mar. 26, 2018, which claims priority to Chinese Patent Application No. 201710237464.8, filed on Apr. 12, 2017. The disclosures of the aforementioned applications are hereby incorporated by reference in their entireties.

TECHNICAL FIELD

The present invention relates to the communications field, and in particular, to a data sending method, a data receiving method, and a related device.

BACKGROUND

In an application scenario of a 5G new air interface, data of various service types may be transmitted in parallel. For example, eMBB (enhanced Mobile Broadband) data and URLLC (Ultra-Reliable and Low Latency Communication) data may be transmitted within a same scheduling period. URLLC data has characteristics of low latency and high reliability and therefore usually has a relatively high priority. In a process in which a base station is to send eMBB data, if new URLLC data arrives, the base station punctures time-frequency resources of the eMBB data and allocates, to the received URLLC data, time-frequency resources that originally belong to the eMBB data. FIG. 1a is a schematic diagram of time-frequency resources allocated to eMBB data in a slot n, and FIG. 1b is a schematic diagram showing that URLLC data punctures time-frequency resources of the eMBB data in the slot n. Because the time-frequency resources of the eMBB data are punctured by the URLLC data, the eMBB data sent by the base station in the slot n becomes incomplete. The base station needs to retransmit the eMBB data to ensure that user equipment receives the correct eMBB data. How to retransmit eMBB data is an urgent problem that needs to be resolved at present.

SUMMARY

A technical problem to be resolved by embodiments of the present invention is to provide a data sending method, a data receiving method, and a related device, to resolve a problem of retransmitting punctured data.

According to a first aspect, this application provides a data sending method, including: within a first scheduling period, first type data of a network device is punctured by second type data. The network device may be a base station. The first type data and the second type data are data of two different service types. A priority of the second type data is higher than that of the first type data. For example, the first type data is eMBB data, and the second type data is URLLC data. Puncturing indicates that time-frequency resources of the first type data are preempted by the second type data. The network device determines a first data subset, punctured by the second type data, in the first type data and determines puncture location information of the first data subset in the first type data. Data that is not punctured by the second type data and that is in the first type data is a second data subset. The first data subset and the second data subset constitute the first type data. Within the first scheduling period, the network device transmits the second data subset and the second type data. Within a second scheduling period, the network device transmits the first data subset, the puncture location information, and puncture indication information. The puncture indication information indicates that the first data subset transmitted by the second scheduling period is retransmitted data triggered by puncturing.

It should be noted that the network device sets a same HARQ process number for the first scheduling period and the second scheduling period, indicating that both the first scheduling period and the second scheduling period are used to transmit the first type data. The HARQ process number may be carried in DCI. In an embodiment of implementing the first aspect, if the first type data is punctured, the network device preserves the punctured first data subset in the first type data and the puncture location information of the first data subset by user equipment in the first type data, and retransmits the first data subset within the second scheduling period. In this way, the network device does not need to wait for feedback from the user equipment before the network device can perform a retransmission operation, so that latency of retransmission is reduced. In addition, the network device only needs to retransmit the punctured first data subset within the second scheduling period but does not need to retransmit the entire first type data, so that an amount of data to be retransmitted is reduced and fewer transmission resources are consumed.

In a possible implementation of the first aspect, the first data subset, the second data subset, and the first type data are scrambled sequences obtained after scrambling processing. The first data subset is one or more continuous bit sequences in the first type data.

In one embodiment of the first aspect, the first data subset and the first type data are modulated symbol sequences obtained after modulation processing.

In one embodiment of the first aspect, the puncture location information indicates a starting location of the first data subset in the first type data and a length of the first data subset. If the first data subset is one continuous bit sequence in the first type data, the puncture location information includes a sequence number of the first bit of the bit sequence in the first type data and a length of the bit sequence. If the first data subset is a plurality of continuous bit sequences in the first type data, the puncture location information includes a sequence number of the first bit of each bit sequence in the first type data and a length of each bit sequence.

In one embodiment of the first aspect, the puncture location information indicates:

a first mapping pattern of the first data subset in a time-frequency resource block corresponding to the first scheduling period; or a conversion rule of the first data subset in a time-frequency resource block corresponding to the second scheduling period, where the conversion rule indicates a correspondence between a first mapping pattern and a second mapping pattern of the first data subset in the time-frequency resource block corresponding to the second scheduling period.

In one embodiment of the first aspect, the transmitting the first data subset includes:

calculating a cyclic redundancy check CRC code of the first data subset according to a CRC (Cyclic Redundancy Check) algorithm;

adding the CRC code after the first data subset to generate a check bit sequence;

performing segmentation processing on the check bit sequence to obtain a plurality of code blocks;

adding a CRC code to each code block;

performing channel coding processing on the code blocks to which the CRC codes are added to obtain a channel coding sequence;

performing rate matching on the channel coding sequence to obtain a redundancy version sequence;

performing scrambling processing on the redundancy version sequence to obtain a scrambled sequence;

performing modulation processing on the scrambled sequence to obtain a modulated symbol sequence;

performing resource mapping and IFFT (Inverse Fast Fourier Transform) processing on the modulated symbol sequence to obtain an OFDM (Orthogonal Frequency Division Multiplexing) symbol;

performing up-conversion processing on the OFDM symbol to obtain a radio frequency signal; and sending the radio frequency signal to the user equipment.

In one embodiment of the first aspect, the transmitting the first data subset includes:

performing resource mapping and IFFT processing on the first data subset to obtain an OFDM symbol;

performing up-conversion processing on the OFDM symbol to obtain a radio frequency signal; and sending the radio frequency signal to the user equipment.

In one embodiment of the first aspect, the puncture location information is transmitted to the user equipment by using downlink control information (DCI) on a physical downlink control channel or through a physical downlink shared channel.

In one embodiment of the first aspect, the puncture indication information is sent to the user equipment by using DCI or a MAC-CE (media access control control element) on a physical downlink control channel.

According to a second aspect, this application provides an eMBB data receiving method. First, user equipment receives a second data subset within a first scheduling period and preserves the second data subset. The user equipment receives a first data subset, location information, and puncture indication information within a second scheduling period. Puncture location information indicates a location of the first data subset in first type data. The puncture indication information indicates that the first data subset is retransmitted data triggered by puncturing. The user equipment further receives second type data within the first scheduling period. The second type data is data that punctures a time-frequency resource block of the first type data. The first type data and the second type data are data of different service types. A priority of the second type data is higher than that of the first type data. For example, the first type data is eMBB data, and the second type data is URLLC data. When receiving the puncture indication information within the second scheduling period, the user equipment determines that the first data subset is retransmitted data triggered by puncturing. When scheduling data transmission once, a network device sets a same HARQ process number for all scheduling periods. The user equipment may obtain a current HARQ process number based on a DCI received within the second scheduling period, then determine, in the former scheduling period, the first scheduling period having the same current HARQ process number, obtain the second data subset preserved within the first scheduling period, and combine the first data subset and the second data subset based on the puncture location information to obtain original data. In an embodiment of implementing the second aspect, the user equipment preserves the second data subset when receiving the second data subset within the first scheduling period. The user equipment receives the first data subset within the second scheduling period, and determines, based on the puncture indication information, that the first data subset is retransmitted data triggered by puncturing. The user equipment combines the first data subset and the second data subset based on the location information to obtain the complete first type data. The network device does not need to wait for feedback from the user equipment before the network device can retransmit data to the user equipment, so that latency of retransmission is reduced. In addition, retransmitted data received by the user equipment is the first data subset that is a part of the first type data, and it is not necessary to receive the entire first type data, so that an amount of retransmitted data that is to be received is reduced.

In one embodiment of the second aspect, the first data subset, the second data subset, and the first type data are scrambled sequences obtained after demodulation processing.

In one embodiment of the second aspect, the first data subset, the second data subset, and the first type data are modulated symbol sequences obtained after fast Fourier transform FFT processing.

In one embodiment of the second aspect, the puncture location information indicates a starting location of the first data subset in the first type data and a length of the first data subset.

In one embodiment of the second aspect, the puncture location information indicates:

a first mapping pattern of the first data subset in a time-frequency resource block corresponding to the first scheduling period; or a second mapping pattern and a conversion rule of the first data subset in a time-frequency resource block corresponding to the second scheduling period, where the conversion rule indicates a correspondence between a first mapping pattern and the second mapping pattern.

In one embodiment of the second aspect, the receiving a first data subset includes:

receiving an OFDM symbol;

performing FFT processing on the OFDM symbol to obtain a modulated symbol sequence;

performing demodulation processing on the modulated symbol sequence to obtain a scrambled sequence;

performing descrambling processing on the scrambled sequence to obtain a first redundancy version sequence;

performing rate de-matching processing on the first redundancy version sequence to obtain a first channel coding sequence;

performing channel decoding processing on the first channel coding sequence to obtain a first check bit sequence; and removing a CRC code in the first check bit sequence to obtain the first data subset.

In one embodiment of the second aspect, the method further includes:

performing descrambling processing on the first type data to obtain a second redundancy version sequence;

performing rate de-matching on the second redundancy version sequence to obtain a second channel coding sequence;

performing channel decoding processing on the second channel coding sequence to obtain a second check bit sequence; and determining, based on a CRC code in the second check bit sequence, whether an information bit sequence in the check bit sequence is correct.

In one embodiment of the second aspect, the method further includes:

performing demodulation processing on the first type data to obtain a modulated symbol sequence;

performing descrambling processing on the modulated symbol sequence to obtain a redundancy version sequence;

performing rate de-matching on the redundancy version sequence to obtain a channel coding sequence;

performing channel decoding processing on the channel coding sequence to obtain a check bit sequence; and performing CRC processing based on a CRC code in the check bit sequence.

In one embodiment of the second aspect, the puncture location information is received by using downlink control information DCI on a physical downlink control channel or through a physical downlink shared channel.

In one embodiment of the second aspect, the puncture indication information is received by using DCI or a MAC-CE on a physical downlink control channel.

According to a third aspect, this application provides a data sending apparatus, including:

a preservation unit, configured to: within a first scheduling period, if first type data is punctured by second type data, preserve a first data subset, preempted by the second type data, in the first type data and puncture location information of the first data subset in the first type data; and a transmission unit, configured to transmit the first data subset, the puncture location information, and puncture indication information within a second scheduling period, where the puncture indication information is used to indicate that the first data subset is retransmitted data triggered by puncturing.

In one embodiment of the third aspect, the transmission unit is configured to:

calculate a cyclic redundancy check CRC code of the first data subset according to a CRC algorithm;

add the CRC code after the first data subset to generate a check bit sequence;

perform segmentation processing on the check bit sequence to obtain code blocks;

add a corresponding CRC code to each code block;

perform channel coding processing on the code blocks to which the CRC codes are added to obtain a channel coding sequence;

perform rate matching on the channel coding sequence to obtain a redundancy version sequence;

perform scrambling processing on the redundancy version sequence to obtain a scrambled sequence;

perform modulation processing on the scrambled sequence to obtain a modulated symbol sequence;

perform resource mapping and IFFT processing on the modulated symbol sequence to obtain an OFDM symbol;

perform up-conversion processing on the OFDM symbol to obtain a radio frequency signal; and send the radio frequency signal to user equipment.

In one embodiment of the third aspect, the transmission unit is configured to:

perform resource mapping and IFFT processing on the first data subset to obtain an OFDM symbol;

perform up-conversion processing on the OFDM symbol to obtain a radio frequency signal; and send the radio frequency signal to the user equipment.

According to a fourth aspect, this application provides an apparatus, including a processor and a memory, where the memory stores instructions, and when the apparatus is run, the processor is enabled to perform the following operations:

within a first scheduling period, if first type data is punctured by second type data, instructing the memory to preserve a first data subset, preempted by the second type data, in the first type data and puncture location information of the first data subset in the first type data; and outputting the first data subset, the puncture location information, and puncture indication information, where the puncture indication information is used to indicate that the first data subset is retransmitted data triggered by puncturing.

In one embodiment of the fourth aspect, the processor is further configured to:

calculate a cyclic redundancy check CRC code of the first data subset according to a CRC algorithm;

add the CRC code after the first data subset to generate a check bit sequence;

perform segmentation processing on the check bit sequence to obtain code blocks;

add a corresponding CRC code to each code block;

perform channel coding processing on the code blocks to which the CRC codes are added to obtain a channel coding sequence;

perform rate matching on the channel coding sequence to obtain a redundancy version sequence;

perform scrambling processing on the redundancy version sequence to obtain a scrambled sequence;

perform modulation processing on the scrambled sequence to obtain a modulated symbol sequence;

perform resource mapping and IFFT processing on the modulated symbol sequence to obtain an OFDM symbol;

perform up-conversion processing on the OFDM symbol to obtain a radio frequency signal; and output the radio frequency signal.

In one embodiment of the fourth aspect, the processor is further configured to:

perform resource mapping and IFFT processing on the first data subset to obtain an OFDM symbol;

perform up-conversion processing on the OFDM symbol to obtain a radio frequency signal; and output the radio frequency signal.

According to a fifth aspect, this application discloses a data receiving apparatus, including:

a preservation unit, configured to receive and preserve a second data subset within a first scheduling period;

a receiving unit, configured to receive a first data subset, puncture location information, and puncture indication information within a second scheduling period, where the puncture indication information is used to indicate that the first data subset is retransmitted data triggered by puncturing, and the puncture location information indicates a location of the first data subset in first type data; and a combination unit, configured to combine the first data subset and the second data subset based on the puncture location information to obtain the first type data.

In one embodiment of the fifth aspect, the receiving unit is configured to:

receive an OFDM symbol;

perform FFT processing on the OFDM symbol to obtain a modulated symbol sequence;

perform demodulation processing on the modulated symbol sequence to obtain a scrambled sequence;

perform descrambling processing on the scrambled sequence to obtain a first redundancy version sequence;

perform rate de-matching processing on the first redundancy version sequence to obtain a first channel coding sequence;

perform channel decoding processing on the first channel coding sequence to obtain a first check bit sequence; and remove a CRC code in the first check bit sequence to obtain the first data subset.

In one embodiment of the fifth aspect, the apparatus further includes:

a descrambling unit, configured to perform descrambling processing on the first type data to obtain a second redundancy version sequence;

a rate de-matching unit, configured to perform rate de-matching on the second redundancy version sequence to obtain a second channel coding sequence;

a decoding unit, configured to perform channel decoding processing on the second channel coding sequence to obtain a second check bit sequence; and a CRC unit, configured to determine, based on a CRC code in the second check bit sequence, whether an information bit sequence in the check bit sequence is correct.

In one embodiment of the fifth aspect, the apparatus further includes:

a demodulation unit, configured to perform demodulation processing on the first type data to obtain a modulated symbol sequence;

a descrambling unit, configured to perform descrambling processing on the modulated symbol sequence to obtain a redundancy version sequence;

a rate de-matching unit, configured to perform rate de-matching on the redundancy version sequence to obtain a channel coding sequence;

a decoding unit, configured to perform channel decoding processing on the channel coding sequence to obtain a check bit sequence; and a CRC unit, configured to perform CRC processing based on a CRC code in the check bit sequence.

According to a sixth aspect, this application discloses an apparatus, including a processor and a memory, where the memory stores instructions, and when the apparatus is run, the processor is enabled to perform the following operations:

receiving a second data subset within a first scheduling period;

receiving a first data subset, puncture location information, and puncture indication information within a second scheduling period, where the puncture indication information is used to indicate that the first data subset is retransmitted data triggered by puncturing, and the puncture location information indicates a location of the first data subset in first type data;

combining the first data subset and the second data subset based on the puncture location information to obtain the first type data; and the memory is configured to preserve the second data subset within the first scheduling period.

In one embodiment of the sixth aspect, the processor is further configured to perform FFT processing on an OFDM symbol to obtain a modulated symbol sequence;

perform demodulation processing on the modulated symbol sequence to obtain a scrambled sequence;

perform descrambling processing on the scrambled sequence to obtain a first redundancy version sequence;

perform rate de-matching processing on the first redundancy version sequence to obtain a first channel coding sequence;

perform channel decoding processing on the first channel coding sequence to obtain a first check bit sequence; and remove a CRC code in the first check bit sequence to obtain the first data subset.

In one embodiment of the sixth aspect, the processor is further configured to:

perform descrambling processing on the first type data to obtain a second redundancy version sequence;

perform rate de-matching on the second redundancy version sequence to obtain a second channel coding sequence;

perform channel decoding processing on the second channel coding sequence to obtain a second check bit sequence; and determine, based on a CRC code in the second check bit sequence, whether an information bit sequence in the check bit sequence is correct.

In one embodiment of the sixth aspect, the processor is further configured to:

perform demodulation processing on the first type data to obtain a modulated symbol sequence;

perform descrambling processing on the modulated symbol sequence to obtain a redundancy version sequence;

perform rate de-matching on the redundancy version sequence to obtain a channel coding sequence;

perform channel decoding processing on the channel coding sequence to obtain a check bit sequence; and perform CRC processing based on a CRC code in the check bit sequence.

According to a seventh aspect, this application discloses a computer-readable storage medium, including instructions, where when being run on a computer, the instructions enable the computer to perform the data sending method in the first aspect.

According to an eighth aspect, this application discloses a computer-readable storage medium, including instructions, where when being run on a computer, the instructions enable the computer to perform the data receiving method in the second aspect.

DESCRIPTION OF DRAWINGS

To describe the user equipment and technical solutions in the embodiments of the present invention or in the background more clearly, the following briefly describes the accompanying drawings required for describing the embodiments of the present invention or the background.

DESCRIPTION OF EMBODIMENTS

Figure 2A:
FIG. 2a is a network architecture diagram of a communications system according to an embodiment of the present invention.
Figure 2A:

FIG. 2a is a network structural diagram of a communications system according to an embodiment of the present invention. The communications system includes a base station and user equipment. The communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, a new radio (NR) system, a communications system that integrates multiple communications technologies (for example, a communications system integrating an LTE technology and an NR technology)), or a subsequently evolved communications system.

The base station communicates with the user equipment by using a wireless air interface. The base station may be a BTS (Base Transceiver Station) in a GSM system or a CDMA system or may be an NB (Node B) in a WCDMA system or may be an eNB (evolutional Node B) in an LTE system or even may be a base station in a 5G system and a base station in a future communications system. The base station is mainly responsible for functions such as radio resource management, quality of service management (QoS), and data compression and encryption on an air interface side. On a core network side, the base station is mainly responsible for forwarding control plane signaling and user plane service data to a core network.

The user equipment is a device connected to a network side by using the base station. The user equipment includes, but is not limited to, a cellular phone, a cordless phone, a session initiation protocol (SessiSIP) phone, a wireless local loop (WLL) station, a personal digital assistant (PDA), a handheld device having a wireless communication function, a computing device or another processing device connected to a wireless modem, an in-vehicle device, a wearable device, and a terminal device in a future 5G network.

Figure 2B:
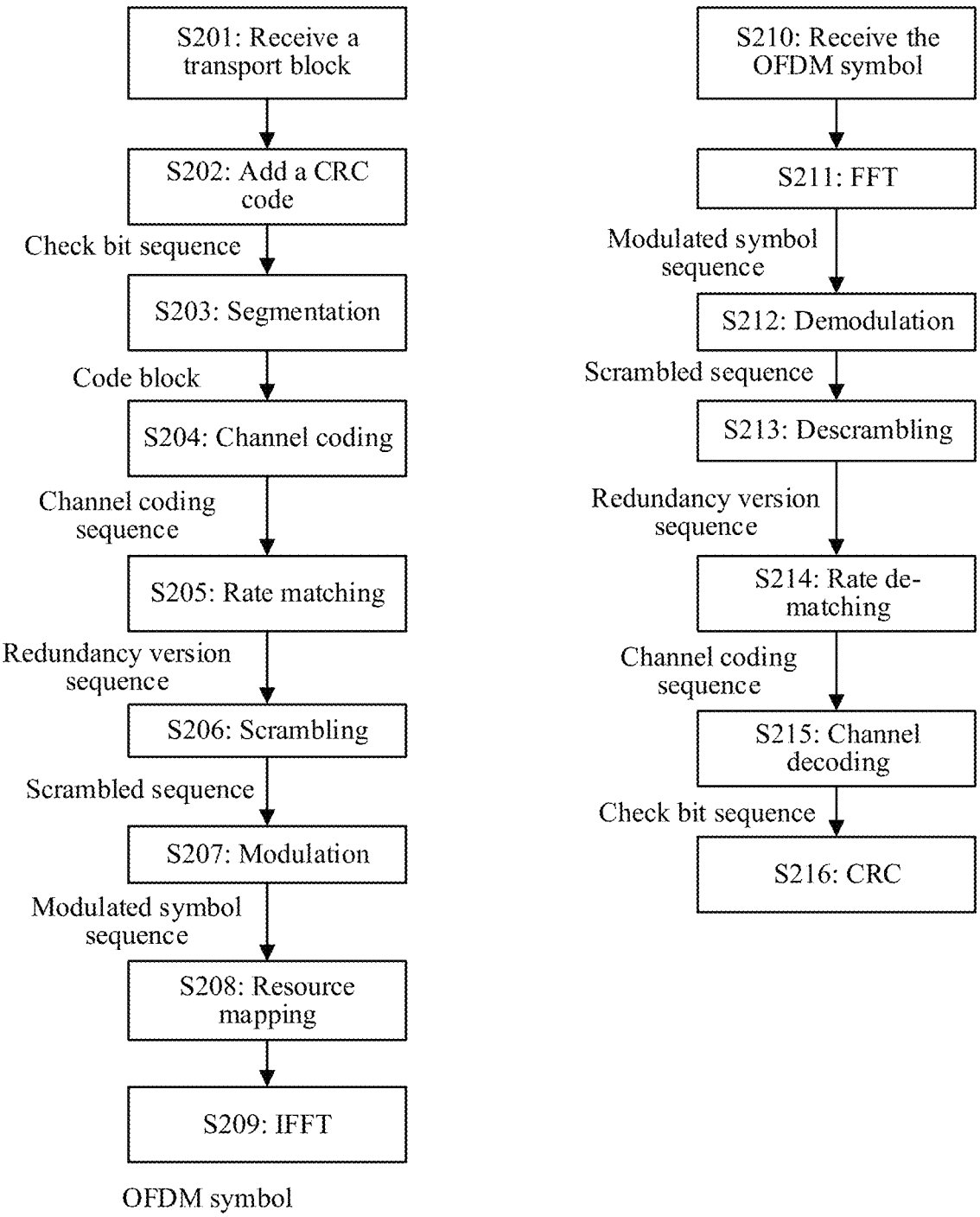
FIG. 2b is a processing flowchart of data on physical layers of a base station and user equipment according to an embodiment of the present invention.

FIG. 2b is a diagram of a working procedure of a communications system according to an embodiment of the present invention. In this embodiment of the present invention, the working procedure includes the following operations.

Operation S201: Receive a transport block.

The transport block (TB) may carry any service type. For example, the transport block is a transport block of an eMBB service or a transport block of a URLLC service. In a slot n, the base station receives, on a physical layer, a transport block sent by a MAC layer. The transport block is a bit sequence. A length of the transport block is not limited in this embodiment. Transport blocks of different service types have different lengths. It should be noted that the base station may process a plurality of transport blocks. Each transport block has the same processing procedure on the physical layer. A processing procedure of one transport block on the physical layer is described below.

Operation S202: Add a CRC code.

The base station may calculate a CRC code of the transport block according to a preset CRC algorithm. The calculated CRC code is a binary sequence having a specified length. The base station adds the calculated CRC code after the TB to generate a check bit sequence. In this embodiment of the present invention, the CRC algorithm includes, but is not limited to, any one of a CRC-8, CRC-12, CRC-16, and CRC-32.

Operation S203: Segmentation.

Segmentation is an optional operation. The base station determines whether a length of the check bit sequence generated in S202 is greater than a preset length threshold (for example, 6144 bits). The length threshold is a maximum length of bits that a coder can process in S204. If it is determined that the length is greater than the length threshold, the base station segments the transport block in S201 into a plurality of subblocks, and a respective corresponding CRC code is added after each subblock to obtain a code block (CB). It needs to be ensured that a length of each code block is less than the length threshold. If it is determined that the length is not greater than the length threshold, a segmentation processing operation is not performed. It should be noted that if segmentation is required, a processing procedure of each code block includes operations S204 to S209. A process of operations S204 to S209 is described below by using an example in which segmentation is not required.

Operation S204: Channel coding.

Channel coding is to provide transmission of information bits with error detection and correction capabilities. A channel coding algorithm includes, but is not limited to, Turbo code, polar code, and LDPC (Low Density Parity Check Code). The base station performs channel coding on the check bit sequence or the code blocks to which the CRC codes are added to obtain a channel coding sequence.

Operation S205: Rate matching.

Rate matching is used to match an amount of data to be transmitted with a quantity of transmission resources. For example, in operation S204, a Turbo coder is used to perform channel coding. The Turbo coder performs channel coding on an input bit stream to output in parallel three bit streams. The three bit streams are a system bit stream, a first check bit stream, and a second check bit stream. The three bit streams are simultaneously input into a row-column interleaver and then stored in a circular buffer. The system bit stream is located at the head of the circular buffer. The first check bit stream and the second check bit stream are sequentially arranged after the system bit stream. A bit selector selects a starting point in the circular buffer, and sequentially selects, from the starting point, a row of data having a specified length as the input bit stream. There are a total of four starting point candidate locations. The input bit streams corresponding to the four locations are referred to as four redundancy versions (RV). In this embodiment, output bit streams of the four redundancy versions are referred to as redundancy version sequences.

Operation S206: Scrambling.

The base station performs a modulo 2 operation on a scrambled code sequence and the redundancy version sequence obtained in operation S205 to obtain a scrambled sequence. An effect of scrambling processing is to randomize interference.

Operation S207: Modulation.

The modulation is used to load the scrambled sequence onto a carrier. A modulation method includes, but is not limited to, any one of QAM, APSK, ASK, and QPSK, etc. A modulation order may be set as required, and is not limited in this embodiment. The base station performs modulation on the scrambled sequence to obtain a modulated symbol sequence.

Operation S208: Resource mapping.

The resource mapping indicates mapping of a modulated symbol in a modulated symbol sequence to a time-frequency resource block corresponding to the slot n on a corresponding antenna port. A rule of resource mapping may be specified in advance according to a protocol of the communications system. The rule of resource mapping may be related to a Cell ID, a subframe number, and a scheduling policy of the base station.

Operation S209: IFFT.

The base station converts each subcarrier of a symbol mapped to each symbol period into an OFDM symbol by using IFFT. The base station then performs up-conversion on the OFDM symbol to obtain a radio frequency signal, and sends the radio frequency signal to the user equipment by using a wireless air interface.

Operation S210: Receive the OFDM symbol.

The user equipment processes data in each subframe on the physical layer by using the same procedure. The user equipment first receives control information in a control channel, and then obtains data information in a data channel by using the control information. The user equipment receives, in the slot n, the OFDM symbol sent by the base station.

Operation S211: FFT.

The user equipment performs FFT processing on the received OFDM symbol, converts the OFDM symbol into a modulated symbol, and searches, a time-frequency resource block corresponding to the slot n based on time-frequency resource locations indicated by the base station, modulated symbols to be sent to the user equipment. The modulated symbols to be sent to the user equipment are referred to as a modulated symbol sequence in this embodiment.

Operation S212: Demodulation.

The user equipment performs demodulation processing on the modulated symbol sequence obtained after FFT processing to obtain a scrambled sequence.

Operation S213: Descrambling.

The user equipment performs an modulo 2 addition operation on the scrambled sequence by using a preset scrambled code sequence to obtain a redundancy version sequence of a redundancy version.

Operation S214: Rate de-matching.

The user equipment performs rate de-matching on the redundancy version sequence obtained in S213 to obtain a channel coding sequence.

Operation S215: Channel decoding.

If segmentation processing is performed on the transport block on a base station side, the user equipment performs channel decoding on each code block. The user equipment performs channel decoding to obtain a check bit sequence.

Operation S216: CRC.

The user equipment determines a CRC code in the check bit sequence and an information bit sequence, calculates a CRC code by using the same CRC algorithm in S202, and performs comparison to determine whether the calculated CRC code is the same as the CRC code in the check bit sequence. If the calculated CRC code is the same as the CRC code, it indicates that the check succeeds, and the user equipment sends an ACK to the base station in a slot n+t1. If the calculated CRC code is not the same as the CRC code, it indicates that the check fails, and the user equipment sends a NACK to the base station in the slot n+t1. It should be noted that if the TB is segmented on the base station side, the user equipment needs to check each CB and then checks the entire TB. If the check of each CB and the check of the entire TB succeed, it indicates that the check succeeds. If the check of each CB fails, the check of the entire TB fails or both the check of each CB and the check of the entire TB fail, the check fails.

If the base station receives, in the slot n+t1, the ACK sent by the user equipment, it is determined that the transport block is successfully transmitted, and a HARQ process of the transport block is released. If the base station receives, in the slot n+t1, the NACK sent by the user, it is determined that the transport block is not transmitted successfully. The base station retransmits another redundancy version to the user equipment in a slot n+t1+t2. As may be learned, a problem that exists in the foregoing data retransmission method is as follows: The base station needs to receive the NACK returned by the user equipment before performing retransmission. Generally, it is necessary to wait a time length of eight slots before retransmission is performed, resulting in high latency of retransmission. In addition, the base station needs to retransmit the entire transport block when receiving the NACK fed back by the user. As a result, an amount of data to be retransmitted is large, and a large quantity of transmission resources are occupied.

Figure 3:
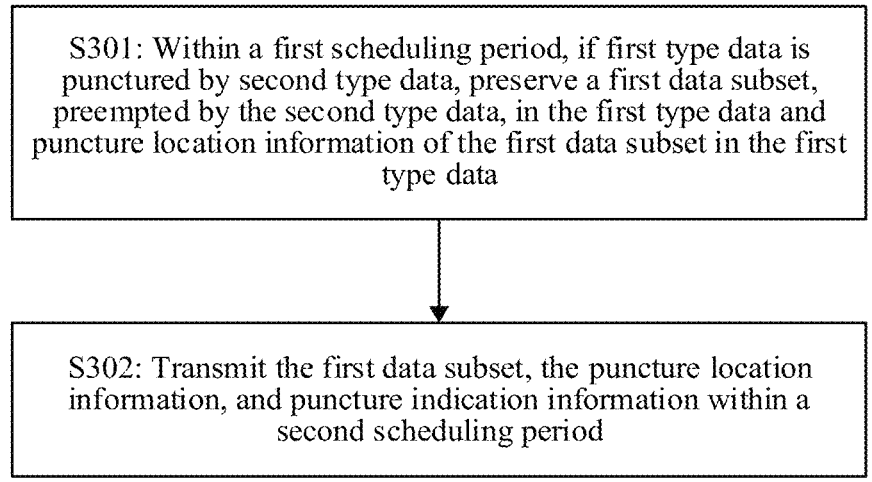
FIG. 3 is a flowchart of a data sending method according to an embodiment of the present invention.

FIG. 3 is a flowchart of a data sending method according to an embodiment of the present invention. In this embodiment of the present invention, the method includes, but is not limited to, the following operations.

Operation S301: Within a first scheduling period, if first type data is punctured by second type data, preserve a first data subset, preempted by the second type data, in the first type data and puncture location information of the first data subset in the first type data.

The first scheduling period may be on a per-slot or subframe basis. A length of the first scheduling period may be at least one slot or at least one subframe. A length of the slot and subframe is not limited in this embodiment. The first type data and the second type data are data of two different service types. A priority of the second type data is higher than that of the first type data. For example, the first type data is eMBB data, and the second type data is URLLC data. Time-frequency resources corresponding to a scheduling period are a time-frequency resource block. The time-frequency resource block is a plurality of OFDM symbols in an entire time domain. Duration of the plurality of OFDM symbols is equal to the scheduling period. The time-frequency resource block is a plurality of subcarriers in an entire frequency domain. One OFDM symbol and one subcarrier are an RE (Resource Element) of the time-frequency resource block. A time-frequency resource block corresponding to the first scheduling period is a first time-frequency resource block. Before the first type data is punctured by the second type data, a network device has allocated time-frequency resources in the first time-frequency resource block to the first type data. The network device may be a base station. When receiving the second type data within the first scheduling period, the network device punctures the time-frequency resources of the first type data. Locations at which the network device punctures the time-frequency resources of the first type data are not limited in this embodiment. Puncturing indicates that the network device allocates, to the second type data instead, time-frequency resources that are originally allocated to the first data subset in the time-frequency resources of the first type data. Therefore, the network device can know locations of REs of the first data subset in the first type data that are punctured. The network device determines the punctured first data subset and the puncture location information of the first data subset in the first type data based on the locations of the punctured REs. The network device preserves the first data subset and the puncture location information. Because the first type data is punctured by the second type data, the network device can only send, to user equipment within the first scheduling period, the second type data and a second data subset that is not punctured by the second type data and that is in the first type data.

Operation S302: Transmit the first data subset, the puncture location information, and puncture indication information within a second scheduling period.

Specifically, the second scheduling period may be on a per-slot or subframe basis. Duration of the second scheduling period is at least one slot or at least one subframe. A length of the slot and subframe is not limited in this embodiment. The first scheduling period and the second scheduling period may belong to two adjacent scheduling operations or may belong to two nonadjacent scheduling operations. For example, the first scheduling period is a slot n, and the second scheduling period is a slot n+1. For another example, the first scheduling period is a slot n, and the second scheduling period is a slot n+3. A time-frequency resource block corresponding to the second scheduling period is a second time-frequency resource block. The network device transmits the first data subset, the puncture location information, and the puncture indication information within the second scheduling period. The puncture location information indicates a location of the first data subset in the first type data. The puncture indication information indicates that the first data subset is retransmitted data triggered by puncturing. The puncture location information and the puncture indication information are carried in DCI delivered by the network device within the second scheduling period or may be carried in other information delivered by the network device within the second scheduling period. This is not limited in this embodiment.

During implementation of the foregoing embodiment, within the first scheduling period, if the first type data to be sent is punctured by the second type data, the network device preserves the first data subset, punctured by the second type data, in the first type data and the puncture location information of the first data subset in the first type data, and sends the first data subset, the puncture location information, and the puncture indication information to the user equipment within the second scheduling period. The network device does not need to wait for feedback from the user equipment before the network device can perform a retransmission operation, so that latency of a retransmission operation is reduced. In addition, the network device does not need to retransmit the entire first type data during retransmission, and only needs to retransmit the punctured first data subset, so that an amount of data to be retransmitted is reduced and the retransmission operation occupies fewer time-frequency resources.

Figure 4:
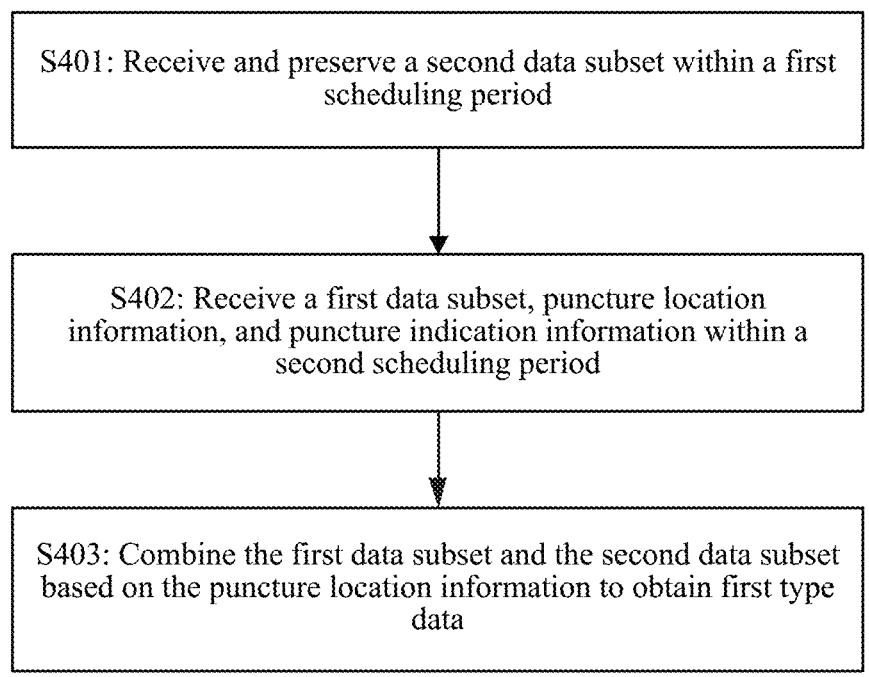
FIG. 4 is a flowchart of a data receiving method according to an embodiment of the present invention.

FIG. 4 is a flowchart of a data receiving method according to an embodiment of the present invention. In this embodiment of the present invention, the method includes the following operations.

Operation S401: Receive and preserve a second data subset within a first scheduling period.

The first scheduling period may be on a per-slot or subframe basis. A length of the slot or subframe is not limited in this embodiment. The first scheduling period includes at least one slot or at least one subframe. A length of the first scheduling period is not limited in this embodiment. Time-frequency resources corresponding to the first scheduling period are a first time-frequency resource block. User equipment obtains the second data subset at specified locations in the first time-frequency resource block based on control information of a network device, and preserves the second data subset, where the second data subset is a part of first type data to be sent in the network device, and the second data subset is data that is not punctured by second type data and that is in the first type data.

Operation S402: Receive a first data subset, puncture location information, and puncture indication information within a second scheduling period.

The second scheduling period may be on a per-slot or subframe basis. A length of the slot or subframe is not limited in this embodiment. The second scheduling period includes at least one slot or at least one subframe. The first scheduling period and the second scheduling period may belong to two adjacent scheduling operations or may belong to two nonadjacent scheduling operations. For example, the first scheduling period is a slot n, and the second scheduling period is a slot n+1. For another example, the first scheduling period is a slot n, and the second scheduling period is a slot n+2. Time-frequency resources corresponding to the second scheduling period are a second time-frequency resource block. The user equipment may parse the second time-frequency resource block based on an indication of the network device to obtain the first data subset, the puncture location information, and the puncture indication information. The puncture location information and the puncture indication information may be in DCI of a physical downlink control channel of the second time-frequency resource block. The user equipment determines a location of the first data subset in the first type data based on the puncture location information. In this way, a location relationship between the first data subset and the second data subset may be determined.

Operation S403: Combine the first data subset and the second data subset based on the puncture location information to obtain the first type data.

Specifically, the user equipment determines the location relationship between the first data subset and the second data subset based on the puncture location information, and the user equipment combines the first data subset and the second data subset to obtain the first type data.

During implementation of the foregoing embodiment, the user equipment receives and preserves the second data subset within the first scheduling period, the user equipment receives the first data subset, the puncture location information, and the puncture indication information within the second scheduling period, the user equipment learns, based on the puncture indication information, that the first data subset is retransmitted data triggered by puncturing, and the user equipment combines the first data subset and the second data subset based on the puncture location information to obtain the first type data. In this way, the network device does not need to wait for feedback from the user equipment before the network device can retransmit data to the user equipment, so that latency of a retransmission operation is reduced. In addition, the user equipment does not need to receive the entire eMBB data during the retransmission operation, and only needs to receive data that is a part of first type data, so that an amount of data of the retransmission operation is reduced and fewer time-frequency resources are occupied.

Figure 5:
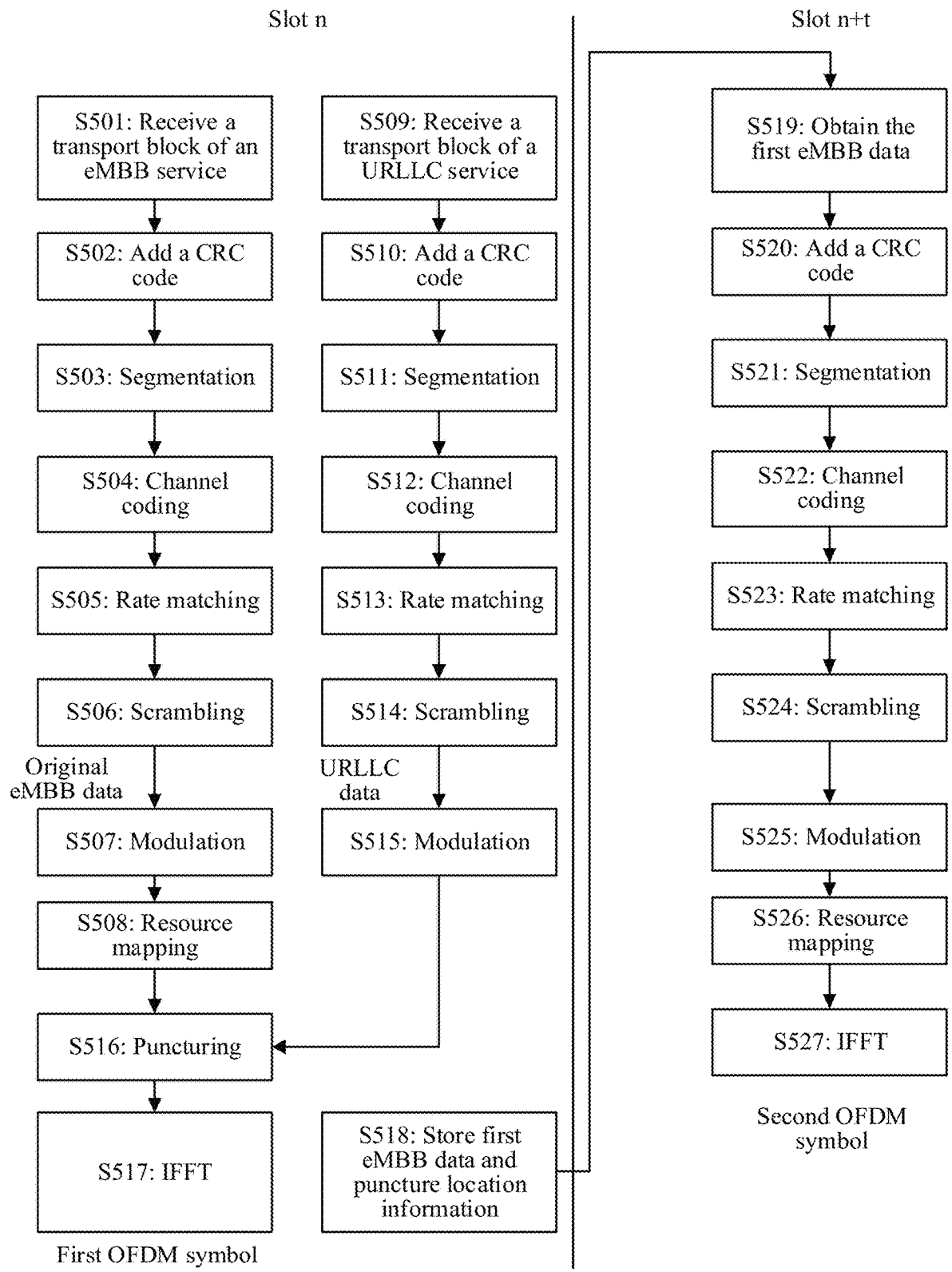
FIG. 5 is another flowchart of a data sending method according to an embodiment of the present invention.

Referring to FIG. 5, first type data is original eMBB data, second service type data is URLLC data, a first data subset is first eMBB data, and a second data subset is second eMBB data. An eMBB data sending method in an embodiment of the present invention is described below in detail by using an example in which the first eMBB data, the second eMBB data, and the original eMBB data are scrambled sequences obtained after scrambling processing. In this embodiment, the method includes the following operations.

Operation S501: Receive a transport block of an eMBB service. A base station receives the transport block of the eMBB service in a slot n.

Operation S502: Add a CRC code.

Operation S503: Segmentation.

Operation S504: Channel coding.

Operation S505: Rate matching.

Operation S506: Scrambling.

An implementation process of operations S501 to S506 is the same as that of S201 to S206 in FIG. 2b. For a specific process, refer to description of S201 to S206. Details are not described herein again. It should be noted that a scrambled sequence of the eMBB service generated by the base station after scrambling processing is referred to as the original eMBB data.

Operation S507: Modulation.

The base station performs modulation on the original eMBB data to generate a modulated symbol sequence. A specific modulation method is not limited in this embodiment.

Operation S508: Resource mapping.

A time-frequency resource block corresponding to the slot n is a first time-frequency resource block. The base station maps a modulated symbol sequence of the eMBB service to REs of the first time-frequency resource block. A mapping method is not limited in this embodiment.

Figure 1A:
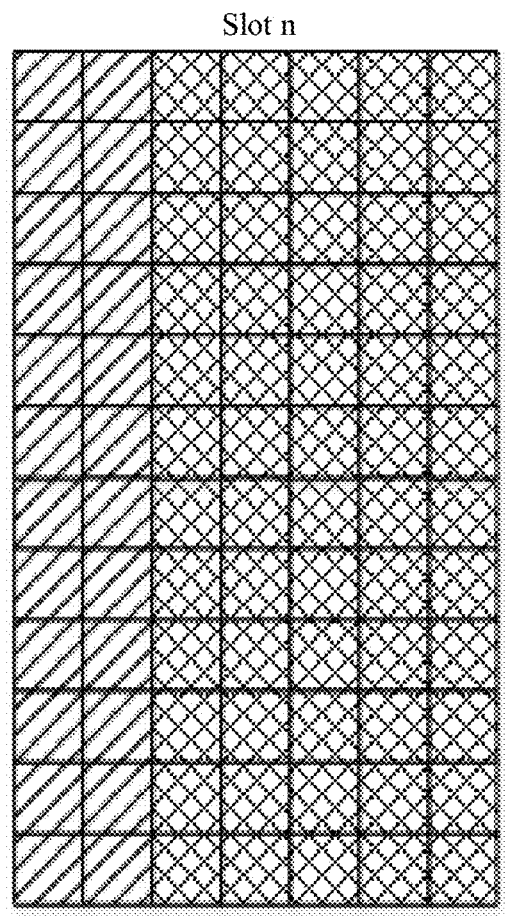
FIG. 1a shows a mapping pattern of a control channel and eMBB data on a time-frequency resource block of a slot n.
Figure 1A:
Figure 1A:

For example, referring to FIG. 1a, the first time-frequency resource block corresponds to seven OFDM symbols in a time domain and corresponds to 12 subcarriers in a frequency domain. The first time-frequency resource block includes 84 REs. The base station maps the modulated symbol sequence of the eMBB service to the third column to the seventh column of REs in the first time-frequency resource block. Each modulated symbol is mapped to one RE. A total of 60 REs are allocated to the modulated symbols of the eMBB service. The first column and the second column of REs in the first time-frequency resource block are allocated to a control channel.

Operation S509: Receive a transport block of a URLLC service.

In the slot n, a physical layer of the base station receives a new transport block of the URLLC service. It should be noted that the operation in which the base station receives the transport block of the URLLC service may be performed before or after any operation of S501 to S508. This is not limited in this embodiment.

Operation S510: Add a CRC code.

Operation S511: Segmentation.

Operation S512: Channel coding.

Operation S513: Rate matching.

Operation S514: Scrambling.

An implementation process of operations S509 to S514 is the same as that of operations S201 to S206 in FIG. 2b. For a specific implementation process, refer to description of S201 to S206. Details are not described herein again. It should be noted that the base station performs scrambling processing to generate a scrambled bit sequence of the URLLC service. The scrambled bit sequence of the URLLC service is referred to as URLLC data in this embodiment.

Operation S515: Modulation.

The base station modulates the URLLC data to generate a modulated symbol sequence of the URLLC service. A modulation method is not limited in this embodiment.

Operation S516: Puncturing.

The base station performs puncturing in a time-frequency resource block of the original eMBB data in the first time-frequency resource block. Puncturing indicates that URLLC data preempts time-frequency resources in the time-frequency resource block of the original eMBB data, and time-frequency resources used to map the first eMBB data in the time-frequency resource block of the original eMBB data are allocated to the URLLC data.

Figure 1B:
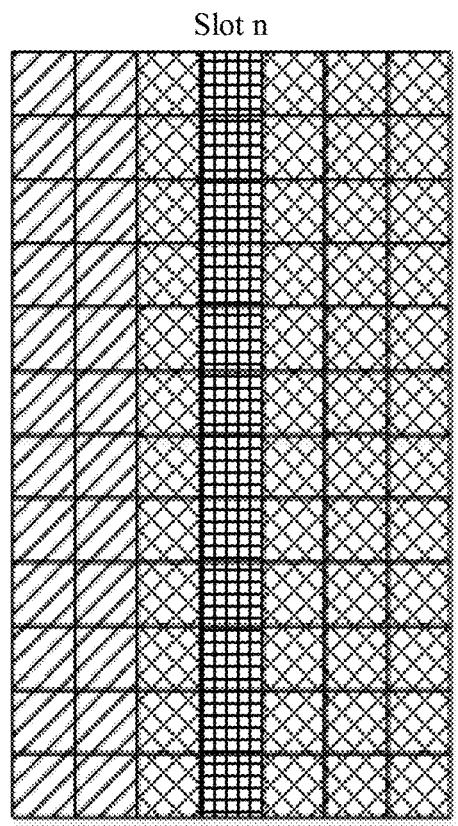
FIG. 1b is a diagram showing that URLLC data punctures time-frequency resources of eMBB data.

For example, referring to FIG. 1b, if the third column to the seventh column of REs in the first time-frequency resource block have been allocated to the original eMBB data, the base station punctures the third column to the seventh column of REs. Assuming that puncture locations selected by the base station in the first time-frequency resource block are the fourth column of REs, the base station allocates the fourth column of REs in the first time-frequency resource block to the URLLC data. In this embodiment, because the original eMBB data, the first eMBB data and the second eMBB data are bit sequences obtained after scrambling processing, the base station first determines punctured REs in the first time-frequency resource block. The base station determines a punctured modulated symbol sequence of the eMBB service based on a correspondence between an RE and a modulated symbol, and then determines a scrambled bit sequence (that is, the first eMBB data) corresponding to the punctured modulated symbol sequence of the eMBB service based on a correspondence between a modulated symbol and a scramble bit. The base station preserves the first eMBB data and puncture location information. In this embodiment, the puncture location information may be indicated by using a starting location and a length of the first eMBB data in the original eMBB data. The first eMBB data may be one continuous sequence in the original eMBB data. Alternatively, the first eMBB data is a plurality of continuous sequences in the original eMBB data. This is not limited in this embodiment.

Figure 7A:
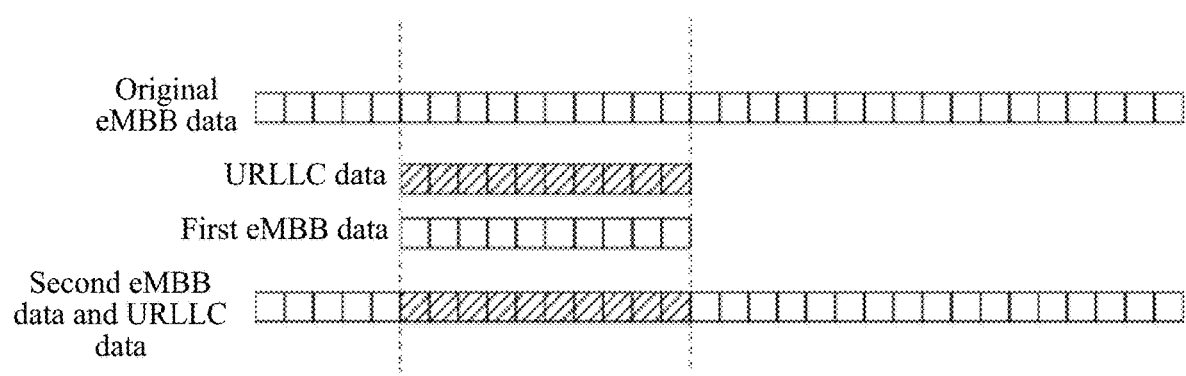
FIG. 7a is a diagram of data puncturing according to an embodiment of the present invention.

Referring to FIG. 7a, data in the first row in FIG. 7a is unpunctured original eMBB data. Data in the second row is URLLC data received in the slot n. The base station determines, based on a puncture pattern in the first time-frequency resource block, that puncture locations of the URLLC data in the original eMBB data are bits between dotted lines. The first eMBB data is the sixth bit to the fifteenth bit in the original eMBB data. The base station determines that the first eMBB data is one continuous sequence. The base station uses the starting location and the length of the first eMBB data to indicate the puncture location information. The starting location of the first eMBB data in this embodiment is 6, and the length of the first eMBB data is 10. A part that is not punctured by the URLLC data in the original eMBB data is the second eMBB data. Data in the fourth row in FIG. 7a is a diagram of distribution of the URLLC data and the second eMBB data obtained after the original eMBB data is punctured.

Figure 7B:
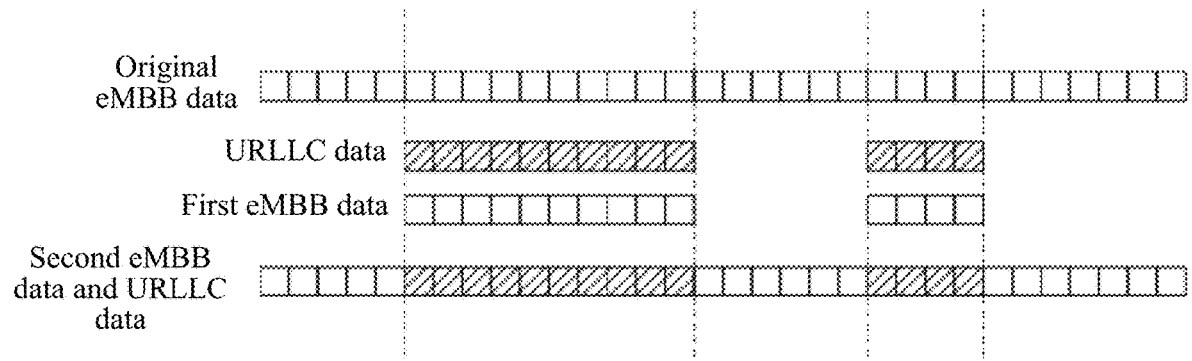
FIG. 7b is another diagram of data puncturing according to an embodiment of the present invention.

Referring to FIG. 7b, the first eMBB data is two continuous sequences, and the base station uses a starting location of each sequence and a length of each sequence to indicate the puncture location information. In this embodiment, a starting location of a first sequence in the first eMBB is 6, and a length of the first sequence is 10; and a starting location of a second sequence is 22, and a length of the second sequence is 4. Data in the fourth row in FIG. 7b is a diagram of distribution of URLLC data obtained after the original eMBB data is punctured and the second eMBB data.

Operation S517: IFFT.

The base station obtains a first OFDM symbol based on the URLLC data and the second eMBB data, and performs up-conversion on the first OFDM symbol to generate a radio frequency signal, and the base station sends the radio frequency signal to user equipment.

Operation S518: Store the first eMBB data and the puncture location information.

The base station may construct a binary sequence A. The binary sequence A is used to indicate the first eMBB data and the puncture location information. As shown in FIG. 7a, the first eMBB data is one continuous sequence. The first eMBB data and the puncture location information stored in the base station are represented as A={d1 d2 d3 d4 d5 d6 d7 d8 d9 d10, 000000110, 00001010}, where d1 to d9 represent bits of the first eMBB data, 00000110 represents that the starting location of the first eMBB data is a sixth bit in the original eMBB data, and 00001010 represents that the length of the first eMBB data is 10.

As shown in FIG. 7b, the first eMBB data is two continuous sequences. Binary information of the first eMBB data and the puncture location information stored in the base station is represented as A={d1 d2 d3 d4 d5 d6 d7 d8 d9 d10, 000000110, 00001010; e1 e2 e3 e4, 00010110, 00000100}, where d1 to d9 represent bits of the first sequence, 00000110 represents that the starting location of the first sequence is the sixth bit in the original eMBB data, and 00001010 represents that the length of the first sequence is 10; and e1 to e4 represent bits of the second sequence, 00010110 represents that the starting location of the second sequence is the twenty-second bit in the original eMBB data, and 00000100 represents that the length of the second sequence is 4. It should be noted that a length of bits used to represent a starting location and a length is not limited to the eight bits in this embodiment. A specific quantity of bits may be set as required.

Optionally, the first eMBB data and the puncture location information are not limited to the foregoing method and may be separately stored. The puncture location information is carried in DCI or a MAC-CE of a downlink control channel.

Operation S519: Obtain the first eMBB data.

In a slot n+t, the base station obtains the first eMBB data and the puncture location information that are preserved in advance, where t is an integer greater than 0.

Operation S520: Add a CRC code.

The addition of a CRC code is an optional operation that adds a CRC code to the first eMBB data to add data error detection and correction capabilities.

Operation S521: Segmentation.

Operation S522: Channel coding.

Channel coding is an optional operation. Channel coding is used to improve anti-interference capability of data.

Operation S523: Rate matching.
Operation S524: Scrambling.
Operation S525: Modulation.
Operation S526: Resource mapping.
Operation S527: IFFT.

The base station performs IFFT processing to obtain a second OFDM symbol, performs up-conversion processing on the second OFDM symbol to obtain a radio frequency signal, and sends the radio frequency signal to the user equipment. It should be noted that a user further needs to send puncture indication information to the user equipment in the slot n+t. The puncture indication information may be carried in DCI of a physical downlink control channel or carried in a MAC-CE or carried in another message in the slot n+t. This is not limited in this embodiment. The puncture indication information indicates that the first eMBB data is retransmitted data triggered by puncturing.

For an implementation process of operations S521 and S527, refer to description of S202 to S207 in FIG. 2b. The base station adds CRC code processing and channel coding processing to the first eMBB data, thereby improving reliability of transmitting the first eMBB data.

During implementation of the foregoing embodiment, in the slot n, if an original scrambled sequence is to be sent, the base station preserves a punctured scrambled sequence in the original eMBB data and the puncture location information of the punctured scrambled sequence in the original scrambled sequence, and sends the punctured scrambled sequence, the puncture location information, and the puncture indication information to the user equipment in the slot n+t. The base station does not need to wait for feedback from the user equipment before the base station performs a retransmission operation, so that latency of a retransmission operation is reduced. In addition, the base station does not need to retransmit the entire original scrambled sequence during retransmission, and only needs to retransmit the punctured scrambled sequence, so that an amount of data to be retransmitted is reduced and the retransmission operation occupies fewer time-frequency resources.

Figure 6:
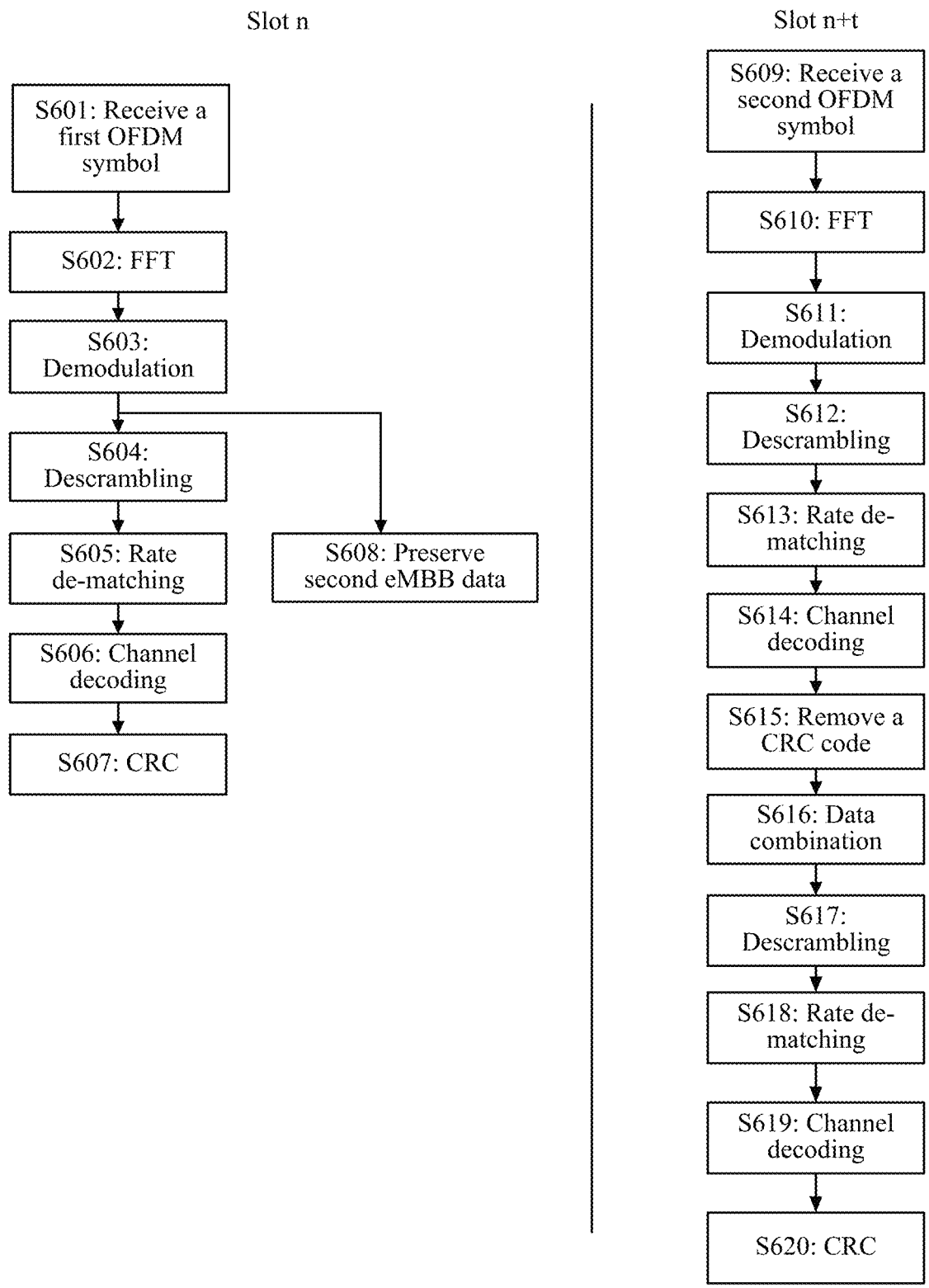
FIG. 6 is another flowchart of a data receiving method according to an embodiment of the present invention.

Correspondingly, FIG. 6 shows a process of receiving eMBB data by the user equipment corresponding to the eMBB data generated as in FIG. 5. In this embodiment of the present invention, the process of receiving eMBB data includes, but is not limited to, the following operations.

Operation S601: Receive the first OFDM symbol.

The user equipment receives, in the slot n, the first OFDM symbol sent by the base station. For a process of generating the first OFDM symbol, refer to FIG. 5.

Operation S602: FFT.
Operation S603: Demodulation.

Demodulation processing is performed to generate the scrambled sequence. The scrambled sequence herein is the second eMBB data.

Operation S604: Descrambling.
Operation S605: Rate de-matching.
Operation S606: Channel decoding.

An implementation process of operations S601 to S606 is the same as that of operations S210 to S215 in FIG. 2b. For a specific process, refer to description of operations S210 to S215. Details are not described herein again.

Operation S607: CRC.

Channel decoding is performed to obtain a check bit sequence. The check bit sequence includes information bits and a CRC code. The CRC code is a bit sequence corresponding to the original eMBB data. The information bits herein are a bit sequence corresponding to the second eMBB data. The CRC code calculated based on the current information bits is different from the CRC code carried in the check bit sequence, and a result of CRC in operation S607 is a failure.

Operation S608: Preserve the second eMBB data.

The user equipment may preserve the scrambled sequence after generating the scrambled sequence in operation S603. The scrambled sequence in this case is the second eMBB data. It should be noted that if a check result of CRC in operation S607 is a success, the user equipment deletes the preserved second eMBB data.

Operation S609: Receive the second OFDM symbol.

The base station receives the second OFDM symbol in the slot n+t. For a process of generating the second OFDM symbol, refer to the process shown in FIG. 5.

Operation S610: FFT.

Operation S611: Demodulation.

Operation S612: Descrambling.

Operation S613: Rate de-matching.

Operation S614: Channel decoding.

Operation S615: Remove the CRC code.

The first eMBB data is obtained after the CRC code is removed.

Operation S616: Data combination.

The puncture location information and the puncture indication information that are sent by the base station are obtained in the slot n+t. If determining, based on the puncture indication information, that the first eMBB data is retransmitted data triggered by puncturing, the user equipment obtains a HARQ process number transmitted in the slot n+t. The HARQ process number may be carried in DCI transmitted in the slot n+t. The base station determines, based on the HARQ process number obtained in the slot n+t, that an initial transmission operation is in the slot n. The slot n and the slot n+t have a same HARQ process number. The user equipment obtains the second eMBB data preserved in the slot n, and combines the first eMBB data and the second eMBB data based on the puncture location information to obtain the original eMBB data. The original eMBB data is the scrambled sequence.

Operation S617: Descrambling.

Operation The base station performs descrambling processing on the scrambled sequence to obtain a redundancy version sequence.

Operation S618: Rate de-matching.

Operation S619: Channel decoding.

Operation S620: CRC check.

It should be noted that for an implementation process of operations S617 to S620, refer to operations S213 to S216 in FIG. 2b. Details are not described herein again.

During the implementation of the foregoing embodiment, the user equipment receives and preserves, in the slot n, scrambled sequences that are not punctured in original scrambled sequences, the user equipment receives punctured scrambled sequences, the puncture location information, and the puncture indication information in the slot n+t, the user equipment learns, based on the puncture indication information, that the data received in the slot n+t is retransmitted data triggered by puncturing, and the user equipment combines the punctured scrambled sequences and the unpunctured scrambled sequences based on the puncture location information to obtain the original scrambled sequences. In this way, the base station does not need to wait for feedback from the user equipment before the base station can retransmit data to the user equipment, so that latency of a retransmission operation is reduced. In addition, the user equipment does not need to receive the entire original scrambled sequence during a retransmission operation, and only needs to receive data that is a part of the original scrambled sequence, so that an amount of data of the retransmission operation is reduced and fewer time-frequency resources are occupied.

Figure 8:
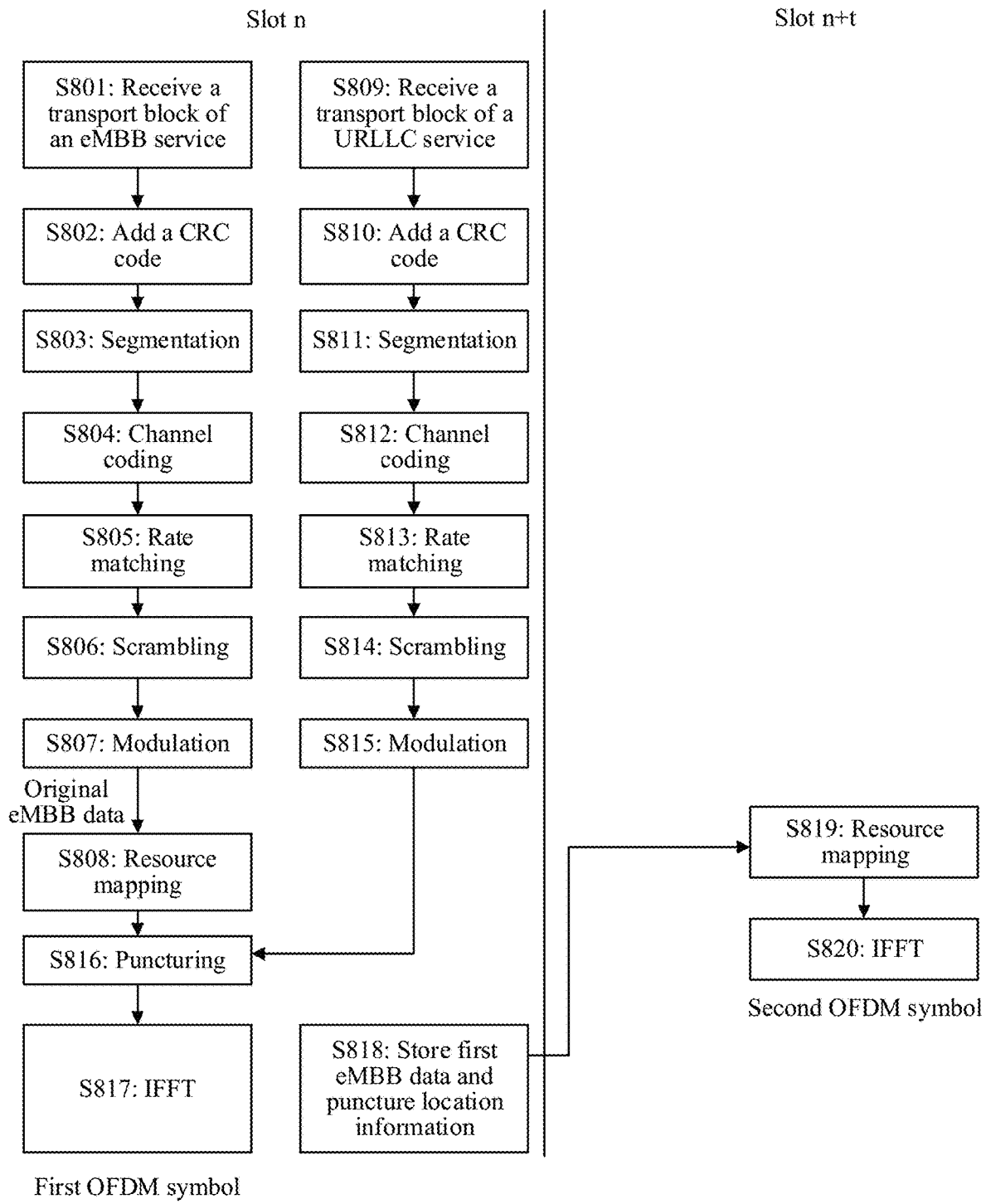
FIG. 8 is another flowchart of a data sending method according to an embodiment of the present invention.

Referring to FIG. 8, first type data is original eMBB data, second service type data is URLLC data, a first data subset is first eMBB data, and a second data subset is the second eMBB data. An eMBB data sending method in an embodiment of the present invention is described below by using an example in which the first eMBB data, the second eMBB data, and the original eMBB data are modulated symbols.

Operation S801: Receive a transport block of an eMBB service.

Operation S802: Add a CRC code.

Operation S803: Segmentation.

Operation S804: Channel coding.

Operation S805: Rate matching.

Operation S806: Scrambling.

Operation S807: Modulation.

For an implementation process of operations S801 to S807, refer to description of operations S201 to S207 in FIG. 2b. Modulation processing is performed to generate a modulated symbol sequence. The modulated symbol sequence herein is referred to as the original eMBB data.

Operation S808: Resource mapping.

A time-frequency resource block corresponding to a slot n is a first time-frequency resource block. A base station maps the original eMBB data to REs of the first time-frequency resource block. A mapping method is not limited in this embodiment.

For example, referring to FIG. 1a, the first time-frequency resource block corresponds to seven OFDM symbols in a slot and corresponds to 12 subcarriers in a frequency domain. The base station maps the original eMBB data to the third column to the seventh column of REs in the first time-frequency resource block. Each modulated symbol in the original eMBB data is mapped to one RE. A total of 60 REs are allocated to the original eMBB data. The first column and the second column of REs in the first time-frequency resource block are allocated for use by a control channel.

Operation S809: Receive a transport block of a URLLC service.

In the slot n, a physical layer of the base station receives a new transport block of the URLLC service. It should be noted that the operation in which the base station receives the transport block of the URLLC service may be performed before or after any operation of S801 to S808. This is not limited in this embodiment.

Operation S810: Add the CRC code.

Operation S811: Segmentation.

Operation S812: Channel coding.

Operation S813: Rate matching.

Operation S814: Scrambling.

Operation S815: Modulation.

An implementation process of operations S810 to S815 is the same as that of operations S201 to S206 in FIG. 2b. For a specific implementation process, refer to description of operations S201 to S206. It should be noted that the base station performs modulation processing to generate the modulated symbol sequence of the URLLC service. The modulated symbol sequence of the URLLC service is referred to as URLLC data in this embodiment.

Operation S816: Puncturing.

The base station performs puncturing in a time-frequency resource block of the original eMBB data in the first time-frequency resource block. Puncturing indicates that URLLC data preempts time-frequency resources in the time-frequency resource block of the original eMBB data, and time-frequency resources used to map the first eMBB data in the time-frequency resource block of the original eMBB data are allocated to the URLLC data.

For example, referring to FIG. 1b, if the base station receives URLLC data in the slot n, the base station determines that time-frequency resources to which the original eMBB data is mapped in the first time-frequency resource block are the third column to the seventh column of REs. The base station punctures the third column to the seventh column of REs. Assuming that puncture locations are the fourth column of REs, the base station allocates the fourth column of REs to the URLLC data. The base station determines punctured REs in the first time-frequency resource block, and determines, based on mapping relationship between an RE and a modulated symbol, the first eMBB data that is punctured for the URLLC data in the original eMBB data.

Operation S817: IFFT.

The base station sends a first OFDM symbol. The first OFDM symbol is generated by using the URLLC data and the second eMBB data.

Operation S818: Store the first eMBB data and puncture location information.

In one embodiment, the first eMBB data is modulated symbols. The puncture location information indicates a first mapping pattern of the first eMBB data in a time-frequency resource block corresponding to a first scheduling period. For example, the base station stores the first mapping pattern of the first eMBB data in the time-frequency resource block in FIG. 1*b*.

Operation S819: Resource mapping.

A time-frequency resource block corresponding to a slot n+t is a second time-frequency resource block. The base station maps the first eMBB data to the second time-frequency resource block. The base station may perform resource mapping according to a rule of performing mapping in a time domain before a frequency domain. Mapping locations in the second time-frequency resource block by the base station are not limited in this embodiment.

Figure 10:
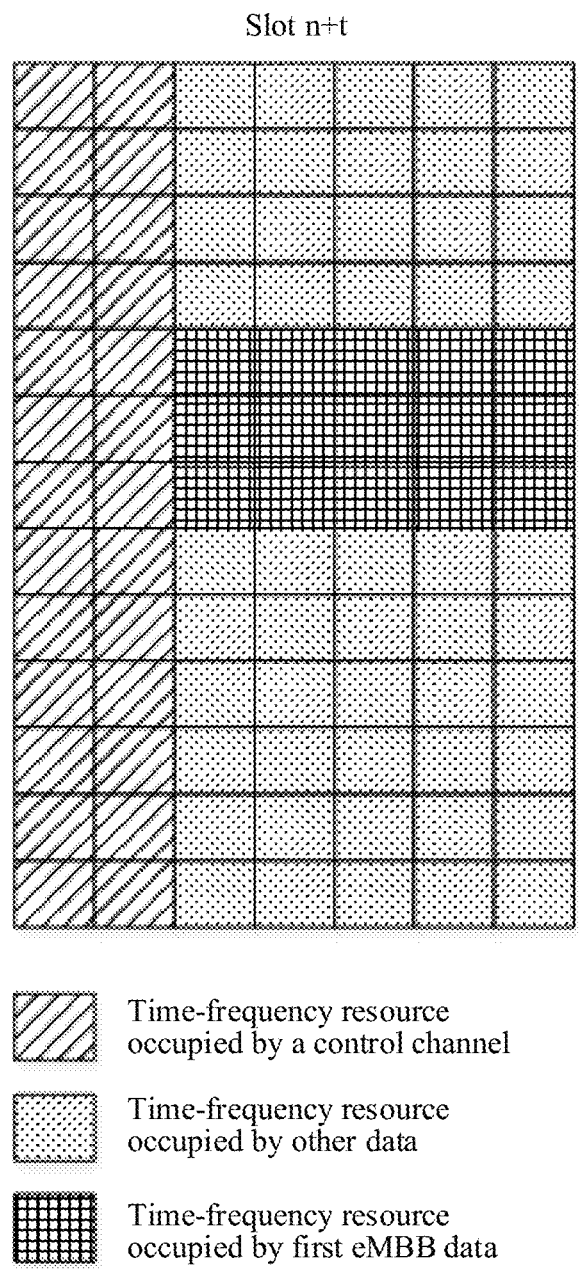
FIG. 10 shows a mapping pattern of first eMBB data on a time-frequency resource block according to an embodiment of the present invention.

For example, referring to FIG. 10, mapping locations of the first eMBB data in the time-frequency resource block corresponding to the slot n+t are REs in the third column to the seventh column and the fifth row to the seventh row.

It should be noted that if the first mapping pattern of the first eMBB data in the time-frequency resource block corresponding to the slot n is the same as a second mapping pattern of the first eMBB data in the time-frequency resource block corresponding to the slot n+t, the puncture location information of which the base station notifies user equipment in the slot n+t may be the first mapping pattern or the second mapping pattern.

In addition, the puncture location information may further indicate a conversion rule of the first eMBB data in a time-frequency resource block corresponding to a second scheduling period, where the conversion rule indicates a correspondence between the first mapping pattern and the second mapping pattern of the first eMBB data in the time-frequency resource block corresponding to the second scheduling period.

For example, the conversion rule indicates a correspondence between the first mapping pattern in FIG. 1*b* and the second mapping pattern in FIG. 10.

Operation S820: IFFT.

The base station performs IFFT on the first eMBB data to obtain a second OFDM symbol, performs up-conversion on the second OFDM symbol to obtain a radio frequency signal, and sends the radio frequency signal to the user equipment.

During implementation of the foregoing embodiment, in the slot n, if an original modulated symbol sequence is to be sent, the base station preserves a punctured modulated symbol sequence in the original eMBB data and puncture location information of the punctured modulated symbol sequence in the original modulated symbol sequences, and sends the punctured modulated symbol sequence, the puncture location information, and puncture indication information to the user equipment in the slot n+t. The base station does not need to wait for feedback from the user equipment before the base station performs a retransmission operation, so that latency of a retransmission operation is reduced. In addition, the base station does not need to retransmit the entire original modulated symbol sequence during retransmission, and only needs to retransmit the punctured modulated symbol sequence, so that an amount of data to be retransmitted is reduced and retransmission operation occupies fewer time-frequency resources.

Figure 9:
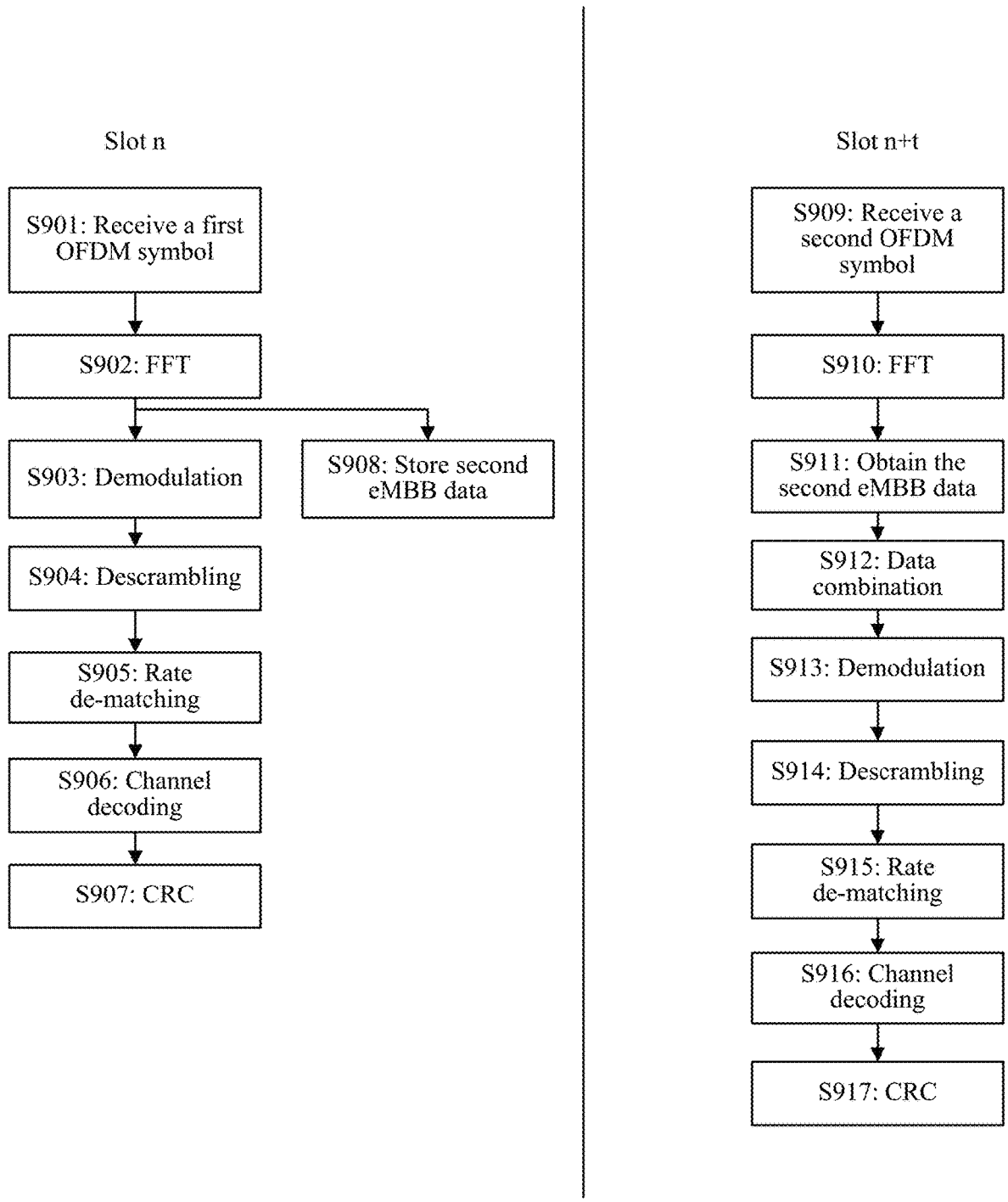
FIG. 9 is another flowchart of a data receiving method according to an embodiment of the present invention.

FIG. 9 is a flowchart of receiving eMBB data by the user equipment corresponding to the eMBB data generated in FIG. 8. In this embodiment of the present invention, the method includes, but is not limited to, the following operations.

Operation S901: Receive the first OFDM symbol.

The user equipment receives the first OFDM symbol in the slot n. For a process of generating the first OFDM symbol, refer to description in FIG. 8.

Operation S902: FFT.

Operation S903: Demodulation.

Operation S904: Descrambling.

Operation S905: Rate de-matching.

Operation S906: Channel decoding.

An implementation process of operations S901 to S906 is the same as that of operations S210 to S215 in FIG. 2*b*. For a specific process, refer to description of operations S210 to S215. Details are not described herein again.

Operation S907: CRC.

Channel decoding is performed to obtain a check bit sequence. The check bit sequence includes an information bit sequence and a check code. The check code is generated from an information bit sequence corresponding to the original eMBB data. The information bit sequence herein is an information bit sequence corresponding to the second eMBB data. Therefore, the CRC code calculated based on the current information bit sequence is different from the CRC code carried in the check bit sequence. A result of CRC in operation S907 is a failure.

Operation S908: Store the second eMBB data.

The user equipment may store the second eMBB data after generating the modulated symbol sequences. It should be noted that a result of CRC in S907 is a success, and the user equipment deletes the stored second eMBB data.

Operation S909: Receive the second OFDM symbol.

The user equipment receives the second OFDM symbol in the slot n+t. For a process of generating the second OFDM symbol, refer to the process shown in FIG. 8.

Operation S910: FFT.

The user equipment performs FFT to obtain the first eMBB data. The first eMBB data is modulated symbol sequences.

Operation S911: Obtain the second eMBB data.

If receiving, in the slot n+t, the puncture indication information sent by the base station, the user equipment determines that the first eMBB data is retransmitted data triggered by puncturing, and obtains the second eMBB data preserved in advance in the slot n. It should be noted that the base station may determine, based on a HARQ process number corresponding to the slot n+t, a slot n having the same HARQ process number. The puncture indication information may be carried in DCI or a MAC-CE of a physical downlink channel or may be carried in another message of the slot n+t. This is not limited in this embodiment.

In one embodiment, the puncture location information indicates the first mapping pattern of the first eMBB data in the first time-frequency resource block of the slot n.

In one embodiment, the puncture location information indicates a conversion rule between the first mapping pattern and the second mapping pattern. The second mapping pattern indicates mapping locations of the first eMBB data in the second time-frequency resource block of the slot n+t. The user equipment may obtain the first mapping pattern of the first eMBB data in the first time-frequency resource block of the slot n according to the conversion rule and based on the second mapping pattern.

It should be noted that if the puncture location information indicates the conversion rule, a demapping operation is further included after 910. Demapping is used to obtain the first mapping pattern based on the second mapping pattern and according to the conversion rule.

The puncture location information may be carried in DCI or a MAC-CE of the slot n+t or in another message. This is not limited in this embodiment.

Operation S912: Data combination.

The user equipment receives, in the slot n+t, the puncture location information sent by the base station, determines a location relationship between the first eMBB data and the second eMBB data based on the puncture location information, and combines the first eMBB data and the second eMBB data to obtain the original eMBB data.

Operation S913: Demodulation.
Operation S914: Descrambling.
Operation S915: Rate de-matching.
Operation S916: Channel decoding.
Operation S917: CRC.

For operations S913 to S917, refer to description of operations S212 to S216 in FIG. 2*b*. Details are not described herein again.

During implementation of the foregoing embodiment, the user equipment receives and preserves, in the slot n, modulated symbol sequences that are not punctured in the original modulated symbol sequences, the user equipment receives, in the slot n+t, the punctured modulated symbol sequences, the puncture location information, and the puncture indication information, the user equipment learns, based on the puncture indication information, that data received in the slot n+t is retransmitted data triggered by puncturing, and the user equipment combines the punctured modulated symbol sequences and the unpunctured modulated symbol sequences based on the puncture location information to obtain the original modulated symbol sequences. In this way, the base station does not need to wait for feedback from the user equipment before the base station can retransmit data to the user equipment, so that latency of a retransmission operation is reduced. In addition, the user equipment does not need to receive all the original modulated symbol sequences during a retransmission operation, and only needs to receive data that is a part of the original modulated symbol sequences. An amount of data of the retransmission operation is reduced and fewer time-frequency resources are occupied.

Figure 11:
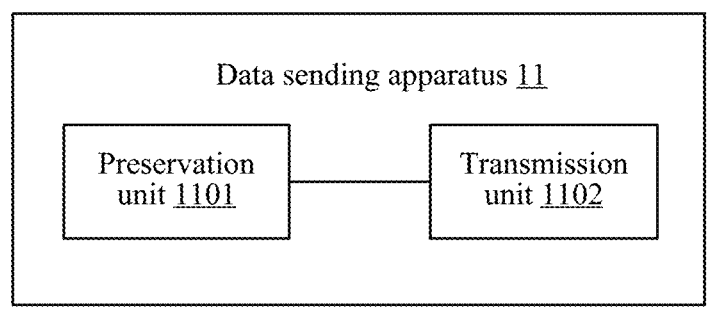
FIG. 11 is a block structural diagram of a data sending apparatus according to an embodiment of the present invention.

It should be noted that a data sending apparatus 11 in FIG. 11 may be implemented on a network device side in the embodiment shown in FIG. 3. A preservation unit 1101 is configured to perform operation S301. A transmission unit 1102 is configured to perform operation S302. The data sending apparatus 11 may be a base station. The data sending apparatus 11 may be alternatively an application-specific integrated circuit (ASIC) or a digital signal processor (DSP) or a chip that implements related functions.

Figure 12:
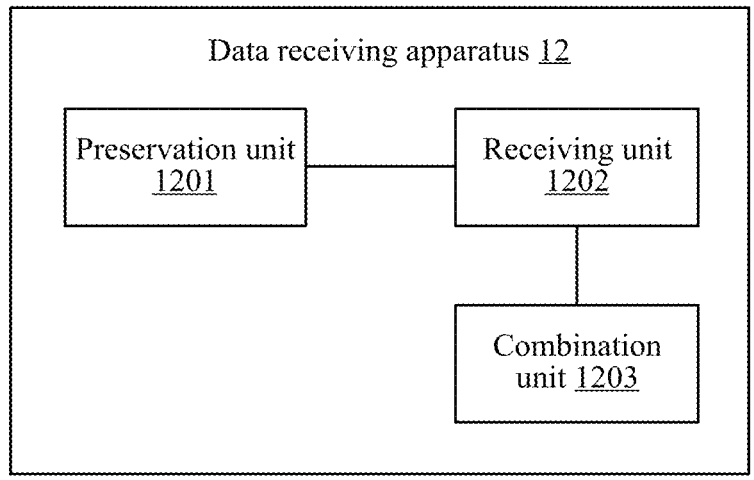
FIG. 12 is a block structural diagram of a data receiving apparatus according to an embodiment of the present invention.

It should be noted that a data receiving apparatus 12 in FIG. 12 may be implemented on a user equipment side in the embodiment shown in FIG. 4. A preservation unit 1201 is configured to perform operation S401. A receiving unit 1202 is configured to perform operation S402. A combination unit 1203 is configured to perform operation S403. The data receiving apparatus 12 may be user equipment. The data receiving apparatus 12 may be alternatively a field-programmable gate array (FPGA), an ASIC, a system on chip (SoC), a central processing unit (CPU), a network processor (NP), a DSP or a microcontroller unit (MCU) that implements related functions, or may further use a programmable controller (e.g., programmable logic device, PLD) or another integrated chip.

Figure 13:
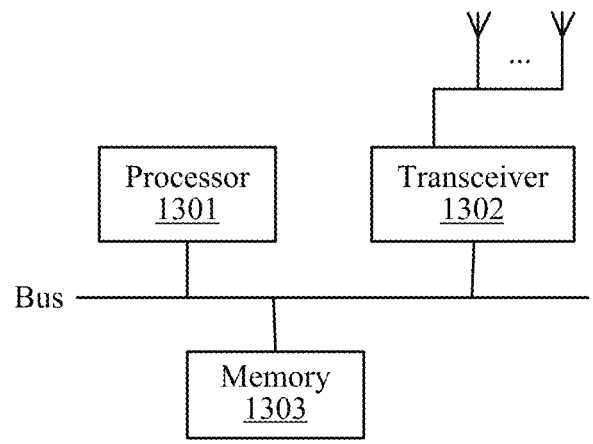
FIG. 13 is a block structural diagram of a network device according to an embodiment of the present invention.

As shown in FIG. 13, an embodiment of the present invention further provides an apparatus 13.

When the apparatus 13 is a network device, for example, a base station, the apparatus 13 includes a processor 1301, a transceiver 1302, and a memory 1303.

The memory 1303 is configured to store a program and data, where the memory may be a random access memory (RAM) or a read-only memory (ROM) or a flash memory. The memory 1303 may be separately located in a communications device or may be located inside a processor 1301. The memory 1303 is configured to preserve a first data subset preempted by second type data in first type data and puncture location information of the first data subset in the first type data.

The transceiver 1302 may be used as a separate chip or may be a transceiver circuit in the processor 1301 or may be used as an input/output interface. The transceiver 1302 is configured to: receive the first type data and the second type data within a first scheduling period, and transmit the first data subset, the puncture location information, and puncture indication information within a second scheduling period, where the puncture indication information is used to indicate that the first data subset is retransmitted data triggered by puncturing.

The processor 1301 is configured to execute the program stored in the memory. When the program is executed, the processor 1301 is configured to: within the first scheduling period, if the first type data is punctured by the second type data, instruct the memory 1302 to preserve the first data subset, occupied by the second type data, in the first type data and the puncture location information of the first data subset in the first type data. The transceiver 1303, the memory 1302, and the processor 1301 are optionally connected by using a bus 3024.

When the network device 13 is a chip, the network device 13 may be a FPGA, an ASIC, a SoC, a CPU, a NP, a DSP or a MCU, or may further use PLD or another integrated chip that implements related functions.

All or some of these chips may be implemented by using software, hardware, firmware or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Figure 14:
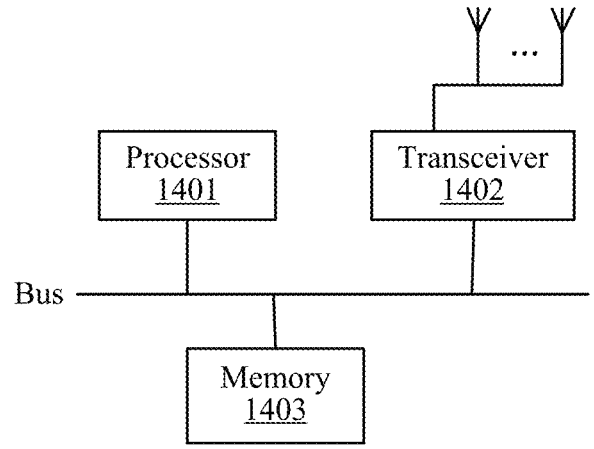
FIG. 14 is a block structural diagram of user equipment according to an embodiment of the present invention.

As shown in FIG. 14, an embodiment of the present invention further provides an apparatus 14.

When the apparatus 14 is user equipment, the apparatus 14 includes a processor 1401, a memory 1402, and a transceiver 1403.

The transceiver 1403 may be used as a separate chip or may be a transceiver circuit in a processor 1401 or may be used as an input/output interface. The transceiver 1401 is configured to: receive a second data subset within a first scheduling period; and receive a first data subset, puncture location information, and puncture indication information within a second scheduling period, where the puncture indication information is used to indicate that the first data subset is retransmitted data triggered by puncturing, and the puncture location information indicates a location of the first data subset in first type data.

The memory 1402 is configured to store a program and data, where the memory may be a RAM or a ROM or a flash memory. The memory may be separately located in a communications device or may be located inside the processor 4042. The memory 1402 is configured to preserve the second data subset within the first scheduling period.

The processor 1401 is configured to execute the program stored in the memory. The processor 1401 is configured to combine the first data subset and the second data subset based on the puncture location information to obtain the first type data.

The transceiver 1403, the memory 1402, and the processor 1401 are optionally connected by using a bus.

When the apparatus 14 is a chip, the apparatus 14 may be a FPGA, an ASIC, a SoC, a CPU, a NP, a DSP or a MCU that implements related functions, or may further use a programmable controller (e.g., PLD) or another integrated chip.

All or some of these chips may be implemented by using software, hardware, firmware or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

An embodiment of the present invention further provides a communications system, including the network device in the foregoing network device embodiment and the user equipment.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

For ease of brevity, each method embodiment may also be used as mutual reference, and details are not described again. In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data sending method, comprising:
within a first scheduling period, if a first type data is punctured by a second type data, preserving a first data subset of the first type data preempted by the second type data, and puncture location information of the first data subset in the first type data, wherein the puncture location information indicates a conversion rule of the first data subset in a time-frequency resource block corresponding to a second scheduling period, wherein the conversion rule indicates a correspondence between a first mapping pattern and a second mapping pattern of the first data subset in the time-frequency resource block corresponding to the second scheduling period; and
within the second scheduling period, transmitting the first data subset, the puncture location information, and puncture indication information, wherein the puncture indication information is used to indicate that the first data subset is retransmitted data triggered by puncturing.

2. The method according to claim 1, wherein the first data subset and the first type data are scrambled sequences obtained after scrambling processing.

3. The method according to claim 1, wherein the puncture location information comprises starting location information of the first data subset in the first type data and length information of the first data subset.

4. The method according to claim 1, wherein the puncture location information indicates
the first mapping pattern of the first data subset in a time-frequency resource block corresponding to the first scheduling period.

5. A data receiving method, comprising:
receiving and preserving a second data subset of a first type data within a first scheduling period;
receiving a first data subset of the first type data, puncture location information, and puncture indication information within a second scheduling period, wherein the puncture indication information is used to indicate that the first data subset is retransmitted data triggered by puncturing of the first type data, and wherein the puncture location information indicates a location of the first data subset in the first type data, wherein the puncture location information indicates a conversion rule of the first data subset in a time-frequency resource block corresponding to the second scheduling period, wherein the conversion rule indicates a correspondence between a first mapping pattern and a second mapping pattern of the first data subset in the time-frequency resource block corresponding to the second scheduling period; and
combining the first data subset and the second data subset based on the puncture location information to obtain the first type data.

6. The method according to claim 5, wherein the first data subset, the second data subset, and the first type data are scrambled sequences obtained after demodulation processing.

7. The method according to claim 5, wherein the first data subset, the second data subset, and the first type data are modulated symbol sequences obtained after fast Fourier transform (FFT) processing.

8. The method according to claim 5, wherein the puncture location information comprises starting location information of the first data subset in the first type data and length information of the first data subset.

9. The method according to claim 5, wherein the puncture location information indicates
the first mapping pattern of the first data subset in a time-frequency resource block corresponding to the first scheduling period.

10. The method according to claim 5, wherein combining the first data subset and the second data subset based on the puncture location information to obtain the first type data further comprises:
performing descrambling processing on the first type data to obtain a redundancy version sequence;
performing rate de-matching on the redundancy version sequence to obtain a channel coding sequence;
performing channel decoding processing on the channel coding sequence to obtain a check bit sequence, wherein the check bit sequence includes an information bit sequence and a cyclic redundancy check (CRC) code; and
determining, based on the CRC code in the check bit sequence, whether the information bit sequence in the check bit sequence is correct.

11. The method according to claim 5, wherein combining the first data subset and the second data subset based on the puncture location information to obtain the first type data further comprises:
performing demodulation processing on the first type data to obtain a modulated symbol sequence;
performing descrambling processing on the modulated symbol sequence to obtain a redundancy version sequence;
performing rate de-matching on the redundancy version sequence to obtain a channel coding sequence;
performing channel decoding processing on the channel coding sequence to obtain a check bit sequence, wherein the check bit sequence includes an information bit sequence and a cyclic redundancy check (CRC) code; and
performing CRC processing on the information bit sequence based on the CRC code in the check bit sequence.

12. The method according to claim 5, wherein the puncture location information is received by using downlink control information (DCI) on a physical downlink control channel (PDCCH) or through a physical downlink shared channel, and wherein the puncture indication information is received by using the DCI or a media access control control element (MAC-CE) on the PDCCH.

13. A terminal, comprising:
a transceiver configured to receive a second data subset of a first type data within a first scheduling period, and to receive a first data subset of the first type data, puncture location information, and puncture indication information within a second scheduling period, wherein the puncture indication information is used to indicate that the first data subset is retransmitted data triggered by puncturing of the first type data, and wherein the puncture location information indicates a location of the first data subset in the first type data, wherein the puncture location information indicates a conversion rule of the first data subset in a time-frequency resource block corresponding to the second scheduling period, wherein the conversion rule indicates a correspondence between a first mapping pattern and a second mapping pattern of the first data subset in the time-frequency resource block corresponding to the second scheduling period;
a memory configured to preserve the second data subset within the first scheduling period; and
a processor configured to combine the first data subset and the second data subset based on the puncture location information to obtain the first type data.

14. The terminal according to claim 13, wherein the processor is further configured to demodulate the first data subset and the second data subset of the first type data to obtain scrambled sequences.

15. The terminal according to claim 13, wherein the processor is further configured to perform fast Fourier transform (FFT) processing on the first data subset and the second data subset of the first type data to obtain modulated symbol sequences.

16. The terminal according to claim 13, wherein the puncture location information indicates a starting location of the first data subset in the first type data and a length of the first data subset.

17. The terminal according to claim 13, wherein the puncture location information indicates the first mapping pattern of the first data subset in a time-frequency resource block corresponding to the first scheduling period.

18. The terminal according to claim 13, wherein the processor is further configured to:
perform descrambling processing on the first type data to obtain a redundancy version sequence;
perform rate de-matching on the redundancy version sequence to obtain a channel coding sequence;
perform channel decoding processing on the channel coding sequence to obtain a check bit sequence, wherein the check bit sequence includes an information bit sequence and a cyclic redundancy check (CRC) code; and
determine, based on the CRC code in the check bit sequence, whether the information bit sequence in the check bit sequence is correct.

19. The terminal according to claim 13, wherein the processor is further configured to:
perform demodulation processing on the first type data to obtain a modulated symbol sequence;
perform descrambling processing on the modulated symbol sequence to obtain a redundancy version sequence;
perform rate de-matching on the redundancy version sequence to obtain a channel coding sequence;
perform channel decoding processing on the channel coding sequence to obtain a check bit sequence, wherein the check bit sequence includes an information bit sequence and a cyclic redundancy check (CRC) code; and
perform CRC processing on the information bit sequence based on the CRC code in the check bit sequence.

20. The terminal according to claim 13, wherein the puncture location information is received by using downlink control information (DCI) on a physical downlink control channel (PDCCH) or through a physical downlink shared channel (PDSCH), and wherein the puncture indication information is received by using the DCI or a media access control control element (MAC-CE) on the PDCCH.

* * * * *